US011002864B2

(12) United States Patent
Veale

(10) Patent No.: US 11,002,864 B2
(45) Date of Patent: May 11, 2021

(54) DEPTH CORRECTION IN PIXELLATED DETECTORS OF IONIZING RADIATION

(71) Applicant: United Kingdom Research and Innovation, Swindon (GB)

(72) Inventor: Matthew Veale, West Berkshire (GB)

(73) Assignee: United Kingdom Research and Innovation, Swindon (GB)

( * ) Notice: Subject to any disclaimer, the term of this patent is extended or adjusted under 35 U.S.C. 154(b) by 0 days.

(21) Appl. No.: 16/619,885

(22) PCT Filed: Jun. 11, 2018

(86) PCT No.: PCT/GB2018/051590
§ 371 (c)(1),
(2) Date: Dec. 5, 2019

(87) PCT Pub. No.: WO2018/229470
PCT Pub. Date: Dec. 20, 2018

(65) Prior Publication Data
US 2020/0209415 A1  Jul. 2, 2020

(30) Foreign Application Priority Data
Jun. 12, 2017  (GB) ..................... 1709298

(51) Int. Cl.
*G01T 1/24*  (2006.01)
(52) U.S. Cl.
CPC .............. *G01T 1/247* (2013.01); *G01T 1/241* (2013.01)
(58) Field of Classification Search
CPC .................. G01T 1/247; G01T 1/241

USPC ..................................... 250/370.14
See application file for complete search history.

(56) References Cited

U.S. PATENT DOCUMENTS

| 6,002,741 | A | 12/1999 | Eisen et al. |
| 6,169,287 | B1* | 1/2001 | Warburton ............ G01T 1/2928 250/370.09 |
| 7,411,197 | B2 | 8/2008 | He et al. |
| 7,518,118 | B2 | 4/2009 | Harrison et al. |
| 7,531,808 | B1* | 5/2009 | De Geronimo ....... G01T 1/2928 250/370.01 |
| 7,692,155 | B2 | 4/2010 | He et al. |
| 2004/0164249 | A1* | 8/2004 | Crosetto ................ A61B 6/037 250/367 |
| 2004/0178348 | A1* | 9/2004 | Wainer .................... G01T 1/242 250/370.09 |

(Continued)

FOREIGN PATENT DOCUMENTS

WO    WO 2015/177534 A1    11/2015

OTHER PUBLICATIONS

Baciak et al., "1 cm Thick Hgl2 Gamma-Ray Spectrometers", *IEEE Nuclear Science Symposium*, 5 (2003), pp. 3532-3536.

(Continued)

*Primary Examiner* — Mark R Gaworecki
(74) *Attorney, Agent, or Firm* — Lathrop GPM, LLP

(57) ABSTRACT

The disclosure relates to spectroscopic sensors of ionizing radiation, and the use of an application specific integrated circuit to detect both positive features in a pixel anode signal indicative of ionizing radiation interacting with that pixel, and negative features indicative of ionizing radiation interacting in an adjacent or proximal pixel. For this purpose, both positive and negative peak hold circuits may be provided in each ASIC pixel circuit.

36 Claims, 17 Drawing Sheets

(56) References Cited

U.S. PATENT DOCUMENTS

| | | | |
|---|---|---|---|
| 2007/0007463 A1* | 1/2007 | DeGeronimo | G01T 1/247 250/382 |
| 2007/0235657 A1* | 10/2007 | He | G01T 1/247 250/389 |
| 2008/0203313 A1* | 8/2008 | Harrison | G01T 1/2928 250/371 |
| 2010/0051818 A1* | 3/2010 | De Geronimo | G01T 1/247 250/370.01 |
| 2011/0049376 A1* | 3/2011 | Zhang | H01L 31/115 250/370.13 |
| 2014/0048714 A1 | 2/2014 | Shahar et al. | |
| 2015/0260854 A1* | 9/2015 | Lux | G01T 1/24 250/371 |
| 2015/0312501 A1 | 10/2015 | Fahim et al. | |
| 2017/0350993 A1* | 12/2017 | Shahar | G01T 1/24 |
| 2018/0356543 A1* | 12/2018 | Shahar | G01T 1/2928 |

OTHER PUBLICATIONS

Boucher et al. "Study of Long-Term CdZnTe Stability Using the Polaris System", IEEE Transactions on Nuclear Science, 60 (2013), pp. 1086-1093.

GB Application No. 1709298.2, Search Report dated Dec. 13, 2017, 5 pages.

He et al. "Position-sensitive single carrier CdZnTe detectors," Nuclear Instruments and Methods in Physics Research Section A, 388 (1997), pp. 180-185.

He et al. "Review of the Shockley-Ramo theorem and its application in semiconductor gamma-ray detectors", Nuclear Instruments and Methods in Physics Research, Section A, 463 (2001), pp. 250-267.

Jones et al. "HEXITEC ASIC—a pixelated readout chip for CZT detectors", Nuclear Instruments and Methods in Physics Research, Section A, 604 (2009) 34-37.

Knoll, "Radiation Detection and Measurement, Fourth Edition", WILEY, (2010) Chapter 17, Section 3. D, 2 pp.

Macias-Montero J. et al., "A 2D 4×4 Channel Readout ASIC for Pixelated CdTe Detectors for Medical Imaging Applications", *IEEE Nuclear Science Symposium and Medical Imaging Conference*, (2013), pp. 1-7.

PCT/GB2018/051590 International Search Report and Written Opinion dated Sep. 5, 2018, 14 pp.

Seller et al. "Pixellated Cd(Zn)Te high-energy X-ray instrument", Journal of Instrumentation, 6 (2011), C12009.

Veale et al. "An ASIC for the Study of Charge Sharing Effects in Small Pixel CdZnTe X-Ray Detectors", IEEE Transactions on Nuclear Science, 58 (2011), pp. 2357-2362.

Wilson et al. "A 10cm × 10cm CdTe Spectroscopic Imaging Detector based on the HEXITEC ASIC", Journal of Instrumentation, 10 (2015), P10011.

Zhang et al. "3-D Position Sensitive CdZnTe Spectrometer Performance Using Third Generation VAS/TAT Readout Electronics", IEEE Transactions on Nuclear Science, 52 (2005), pp. 2009-2016.

* cited by examiner

DEPTH CORRECTION IN PIXELLATED DETECTORS OF IONIZING RADIATION

CROSS REFERENCE TO RELATED APPLICATIONS

This application is a national phase entry under 35 U.S.C. § 371 of PCT/GB2018/051590 filed on Jun. 11, 2018, which claims priority to GB Application No. 1709298.2 filed on Jun. 12, 2017. The contents of each of the aforementioned patent applications are hereby incorporated by reference in their entirety.

The present invention relates to direct conversion semiconductor detectors of ionizing radiation, and in particular such sensors having pixelated arrays of electrodes so as to detect position of a radiation interaction event with the sensor.

By way of example only, the invention may be used in the field of X-ray or Gamma ray imaging spectroscopy, and the detector may be implemented using a monolithic layer of a semiconductor such as Cd(Zn)Te or GaAs on which a pixelated array of anodes is provided at a rear face of the semiconductor layer. The detector may in particular be a small pixel detector, for example in which the pixel pitch is less than half of the thickness of the semiconductor layer.

INTRODUCTION

Direct conversion spectral detection of ionizing radiation can be carried out using a layer of semiconductor material to capture incident radiation so as to generate positive and negative charge, typically electrons and holes, within the material. A bias voltage imposed across the semiconductor layer then sweeps the positive and negative charge in opposite directions for collection by electrodes. A short burst of charge or current induced at an electrode is then typically presumed to be proportional or at least indicative of the energy of a particular radiation interaction event with the semiconductor layer, and therefore of the energy of the radiation itself.

The ionizing radiation to be detected may typically be X-ray or Gamma ray photons, in which case the charge is largely generated by the photoelectric and Compton effects. If the ionizing radiation takes the form of massive charged particles then the charge is largely generated by Coulomb interaction.

A direct conversion detector can be pixelated by providing an array of pixel electrodes on a face of the semiconductor layer, typically using a pixelated array of anodes at a rear face of the layer and a single planar cathode on the opposing front face where the radiation to be detected first arrives. In this way, a lateral position within the pixel array, as well as a measure of the energy of a radiation interaction event with the semiconductor material, can be determined. However, the electrical signal at the anodes and cathode can depend quite strongly on the depth of the radiation interaction within the semiconductor. This is largely due to the low mobility and high trapping rate of holes moving towards the cathode, compared with the higher mobility and lower trapping rate of electrons moving towards the anodes.

The signal at each electrode due to movement of the positive and negative charges can be understood in terms of the Shockley-Ramo theorem (for example see Nuclear Instruments and Methods in Physics Research Section A: Accelerators, Spectrometers, Detectors and Associated Equipment, Volume 463, Issues 1-2, 1 May 2001, Pages 250-267). Each electrode can be considered or modelled as having a weighting potential, for example as discussed below in connection with FIG. 4, which can be used to theoretically visualise the process of charge induction by a charge cloud at different positions in the detector on a given electrode. When the pixel size is small relative to the detector thickness the weighting potential is concentrated close to the pixel. In this instance only carriers that drift in areas of the detector where the weighting potential is concentrated will induce a significant charge on those electrodes. Interactions occurring close to the cathode typically result in a high CCE because the electrons can easily drift across the detector into the region close to the pixel. In the case of the holes, they interact close to the cathode so have a high chance of collection but on top of this they drift in the region where the weighting potential has only a low concentration so they induce only a small amount of charge.

Penetration depth of ionizing radiation into the semiconductor layer before resulting in an interaction event and charge generation is statistical, but for radiation energies corresponding to low average penetration depths relative to a thickness of the semiconductor layer, most interaction events occur close to the cathode, and therefore have high CCEs. However, for radiation energies with average penetration depths within the semiconductor layer which are comparable to or greater than the thickness of the layer, the above inverse dependence of CCE on interaction depth is a significant technical problem for the design and operation of such detectors.

He et al., "Position-sensitive single carrier CdZnTe detectors", Nuclear Instruments and Methods in Physics Research A 388 (1997) 180-185, describes a pixelated detector using a semiconductor layer of CdZnTe. He at al. propose to determine and correct for the effect of interaction depth on CCE based on an observation that this is largely a monotonic function of the ratio of their cathode and anode signals. It should be noted that the weighting potential for a large planar cathode has an essentially constant gradient with distance from the cathode, whereas the weighting potential for a pixel anode is much steeper close to the anode.

The He et al. technique requires associating each radiation interaction event as detected in an anode pixel signal with the same event as detected in the planar cathode signal. He et al. use a single, large planar cathode, so if two interaction events occur close together in time at the detector, they will be difficult to distinguish in the cathode signal, even if the event gives rise to signals in different pixel anodes, limiting the overall rate of interaction events, and therefore which can be detected with spectral detail. Dividing the cathode into multiple separate sub-cathodes can partly address this problem, but then makes instrumentation of the electrodes more complex, and weakening the relationship between cathode and anode signals being relied upon for depth of interaction determination.

The invention seeks to address these and other limitations of the related prior art.

SUMMARY OF THE INVENTION

The invention provides a method of compensating for depth of interaction of ionizing radiation within a detector semiconductor layer of a spectroscopic sensor. Where a positive feature of an electrical signal at an electrode of a first pixel of the detector is indicative of energy of ionizing radiation interacting in that pixel, the effects of depth of interaction of that interaction within the semiconductor layer on the positive feature is compensated for using corresponding negative features detected in electrodes of pixels adjacent or proximal to the first pixel. Where the terms "positive" and "negative" are used in respect of such features, it is meant that these features are of opposite sign or polarity with the feature indicative of energy being deemed positive, and is not meant to indicate that the positive feature necessarily corresponds to a positive current, voltage or other electrical characteristic. In other words, the term "positive" indicates a signal having a magnitude conventionally associated with the energy of an interaction event.

In particular, the positive and negative features may be magnitudes of positive and negative steps in an electrical signal at the electrode itself, or magnitudes of positive or negative peaks in the electrical signal following suitable processing by one or more shaper circuits. Where an interaction event gives rise to positive magnitude features in two or more adjacent pixels, these may be treated together, for example by summing the positive features, optionally using a pixel charge sharing correction, in determining a characteristic of the interaction event. Further aspects of apparatus and methods according to the invention are set out below.

The invention provides apparatus, such as a pixelated sensor, for detecting energy of ionizing radiation incident on the sensor, whereby an interaction event of ionizing radiation with the sensor gives rise to a positive feature in a pixel signal, wherein each pixel is provided with both positive feature detection and negative feature detection. Using data representative of these positive and negative features, an analyser may be arranged to determine energy, or another characteristic, or indeed multiple such characteristics of an interaction event using a positive feature from a pixel, and optionally positive features from adjacent pixels, compensated for depth of interaction within the sensor using negative features from adjacent or nearby pixels.

More particularly, the invention provides a spectroscopic sensor of ionizing radiation, comprising: a semiconductor direct conversion layer; an array of pixel electrodes disposed across a face of the semiconductor direct conversion layer to detect ionizing radiation interacting within the direct conversion layer; and a plurality of pixel circuits, for example provided as part of an application specific integrated circuit. Each pixel circuit may then be arranged to receive a pixel signal from a different corresponding one of the pixel electrodes, to detect whichever of a positive feature or negative feature, if either, occurs in the pixel signal within any particular detection period for that pixel, and to output a magnitude of the detected feature or features for the detection period. Output of the magnitude typically includes output of the sign of that magnitude, or equivalently identification of whether the magnitude is of a positive or negative feature.

Each pixel circuit may be arranged to output a magnitude of both of a positive feature and a negative feature in a particular or each detection period, or some other scheme could be used such as a positive feature being output in preference to a detected negative feature, or a larger magnitude feature being output in preference to a smaller magnitude feature, or features only being output if they exceed a detection threshold. A detection period may typically correspond to a readout period for that pixel, so that at the end of the detection period the, or the largest positive and/or negative feature is read out and the pixel circuit is reset and starts looking for positive and negative features in the new detection/readout period.

For example, the detection period for a pixel, a row or grouping of pixels, or all of the pixels of the sensor, may be a predefined detection or readout period which is not determined by the presence of any radiation interaction with the sensor or by any corresponding positive or negative features detected in the pixel signal for that period. Such predetermined detection or readout periods may be synchronised across the array of pixels for example with all such detection or readout periods being synchronous, or using a rolling shutter scheme in which the readout periods are staggered from row to row or column to column.

Such a predefined detection or readout period may therefore be considered to be defined, implicitly or explicitly, by a schedule or series of predefined readout periods for the sensor, for example a schedule of full frame readouts, and not by the timing for example of radiation incident on the sensor.

In order to be able to provide the magnitude of either a positive or negative feature, each pixel circuit may comprise both a positive peak hold circuit arranged to detect and hold at its output a positive peak corresponding to a positive feature occurring in the pixel signal received from a pixel electrode, and a negative peak hold circuit arranged to detect and hold at its output a negative peak corresponding to a negative feature occurring in the pixel signal from the pixel electrode. Such peak hold circuits are then preferably provided with the pixel signal following processing by at least one shaper circuit, arranged to convert any of a positive or negative step feature in the received pixel signal into a corresponding respective positive or negative peak for detection by the respective positive or negative peak hold circuit.

Positive features in one or more first pixels may be determined to be for the same interaction event as negative features in adjacent or nearby pixels by virtue of these features being from the same or corresponding detection or readout periods. However, since multiple positive and/or negative features may sometimes be detected in a single detection period in a single pixel or adjacent pixels, the detector may further comprise one or more time stamp circuits arranged to output a time stamp of any detected and output positive or negative feature(s) in a particular detection period, so that it can be better determined in such positive and negative features do indeed correspond to the same interaction event.

In other embodiments which do not use the above peak hold circuits, each pixel circuit may instead comprise a preamplifier stage, a baseline compensation stage, and an output stage arranged to output a compensated pixel signal comprising a magnitude of a positive or negative feature detected within a particular detection period. The baseline compensation stage may then comprise: a baseline storage element arranged to receive and store the pixel signal received from the preamplifier stage during a baseline interval of the detection period; and a comparator arranged to compensate the pixel signal input to the baseline comparison stage after the baseline interval using the pixel signal stored by the baseline storage element, and to output the compensated pixel signal to the output stage.

The output stage of each pixel circuit may comprise a readout switch for isolating the output of the baseline compensation stage from the output stage at the end of the detection period.

To this end, the invention also provides a spectroscopic sensor of ionizing radiation, comprising: a semiconductor direct conversion layer; an array of pixel electrodes disposed across a face of the semiconductor direct conversion layer to define pixels for detection of ionizing radiation interacting within the direct conversion layer; and an application specific integrated circuit (ASIC) comprising a plurality of pixel circuits, each pixel circuit being arranged to receive a pixel signal from a different corresponding one of the pixel electrodes, and comprising a preamplifier stage, a baseline compensation stage, and an output stage arranged to output a compensated pixel signal comprising a magnitude of a positive or negative feature detected within a particular detection period, wherein the baseline compensation stage comprises: a baseline storage element arranged to receive and store the pixel signal received from the preamplifier stage during a baseline interval of the detection period; and a comparator arranged to compensate the pixel signal input to the baseline comparison stage after the baseline interval using the pixel signal stored by the baseline storage element, and to output the compensated pixel signal to the output stage. The magnitudes of the positive and negative signal features can then be obtained from the compensated pixel signal from the output stage.

Regardless of the pixel circuit architecture used, typically, the direct conversion layer may comprise CdTe, CdZnTe, or GaAs, which materials have sufficiently low conductivities and high densities to be effective at detecting higher energy X-rays and gamma rays, for example of a few tens to a few hundreds of keV, in a detector operating substantially at room temperature.

Since aspects of the invention rely on an interaction event in the volume of one pixel giving rise to movement of charge through the weighting potentials of adjacent pixels, as discussed in more detail below, there should preferably be no separation in the material of the semiconductor layer such as gaps or insulating divisions between the different pixels. More particularly, and in order to ensure good performance by reducing trapping and other effects, the direct conversion layer may be formed from a single crystal of the semiconductor material, or be monolithic.

The pixel electrodes may in principle be either anodes or cathodes of the detector, but in the embodiments described below the array of pixels disposed across a face of the direct conversion layer is an array of anodes, and a single cathode is provided on the opposing face of the direct conversion layer, although a segmented or pixelated cathode could in principle be used.

Where the pixel circuits are provided using an application specific integrated circuit, this may conveniently be mounted in confrontation with the array of pixel electrodes, and optionally flip chip bonded directly to the semiconductor direct conversion layer face. However, an interposer structure or element could be used where adaption between different pixel pitches of the ASIC and pixel electrode array is required.

In order to carry out suitable data analysis of the detected positive and negative signal features, the apparatus may comprise an analyser arranged to associate positive features in the pixel signal of one or more first ones of the pixel electrodes with a particular interaction event of ionizing radiation within the direct conversion layer, and to associate corresponding negative features in pixel signals of others of the pixel electrodes which are adjacent or proximal to the first pixel electrode with the same interaction event. The analyser may then be arranged to determine a characteristic of the interaction event from the magnitudes of both the one or more positive features and the corresponding negative features.

The characteristic of the interaction event may typically be an energy of the ionizing radiation. The analyser may then be arranged to determine the energy of the ionizing radiation from the magnitudes of the one or more positive features, but corrected using a sum of the magnitudes of at least some of the negative features, or using the magnitudes of the negative features in other ways as described below. For example, a relationship function that defines the energy or other characteristic of the ionizing radiation from the magnitudes of the positive and negative features may be defined empirically by experimentation or calibration, or using more theoretical principles at least in part.

The characteristic of the interaction event may instead be a sub-pixel position of the interaction event, since the magnitudes of the negative features may be indicative of such a sub-pixel position with larger magnitudes for adjacent or proximal pixels to which the interaction event is closer. For example, the analyser may be arranged to determine the sub-pixel position at least partly from a centroid of magnitudes of the negative features in at least some of the adjacent pixels.

Other characteristics of an interaction event may be determined, such as a depth of interaction, and more than one such characteristic may be determined for a particular interaction event, for example both energy and a sub pixel position. Embodiments of the invention may be arranged to determined more than one, or all such characteristics, for example in respect of all or particular interaction events, or depending on the data available for analysis.

The invention may also be defined as providing a method of detecting ionizing radiation using a semiconductor direct conversion layer having an array of pixel electrodes disposed across a face of the layer, the method comprising: detecting the magnitude of a positive feature in pixel signals received from one or more first pixel electrode, the one or more positive features resulting from the same interaction event of ionizing radiation with the direct conversion layer of that pixel; detecting the magnitude of negative features arising from the same interaction event in pixel signals received from a plurality of other pixels, for example adjacent or proximal to the first pixel; and determining a characteristic of the interaction event from the magnitudes of both the positive feature and the corresponding negative features.

The method may then comprise determining a characteristic of the interaction event, such as a spectral energy of the radiation or a depth of interaction, from the magnitudes of both the one or more positive features and the corresponding negative features when it is determined that the positive and negative features relate to the same interaction event, for example being coincident in time. Determining that the positive and negative features are coincident in time may comprise determining one or more of: that the positive and negative features occur in a corresponding pixel detection period; and that the positive and negative features are associated with timestamps indicating that they occurred at the same time within corresponding pixel detection periods.

When the characteristic of the radiation interaction event is an energy of the ionizing radiation, this may be determined from the magnitudes of the one or more positive features corrected using a function of magnitudes of some or all of the negative features, for example a sum of the magnitudes of the negative features determined to arise from the same interaction event. Some particular relationships which describe how to correct the one or more positive magnitudes from the sum of negative magnitudes, and how these can be derived from experimental data and in other ways, are discussed in detail below When the characteristic to be determined is a depth of the interaction event within the semiconductor conversion layer, this can be determined for example from a ratio of the positive magnitude(s) and a sum or other function of the negative amplitudes, or in other ways.

When the characteristic is a sub-pixel position of the interaction event in the plane of the array of the pixel electrodes, this may be determined from a centroid of positions of adjacent pixels weighted according to magnitudes of negative features of those pixels, or in other ways for example using a more generalised and/or calibrated function which relates magnitudes of negative features in adjacent pixels (and optionally also a positive magnitude in a central pixel) to a corresponding sub-pixel position of the interaction event.

Where analysis apparatus and methods of data already output by the pixel circuits or ASIC are discussed, these apparatus and method features may typically be implemented using suitable computer program software executing on appropriate computer hardware, for example comprising one or more processors in association with computer memory. Accordingly, the invention also provides such computer program software, and computer readable media carrying such software. However, such analysis apparatus and methods may also or instead be carried out partly or in full in suitably arranged circuitry or other hardware, such as a field programmable gate array (FPGA), which may conveniently be located proximally to the semiconductor direct conversion layer, for example being integrated on the ASIC, if desired.

Although aspects of the invention are described as providing an ASIC or other circuitry arranged to detect positive and negative signal features, this functionality could instead be provided as part of the analyser functionality, for example by recording electrode signals and detecting the positive and negative signal features using suitable software executing on one or more computer processors or the FPGA mentioned above.

BRIEF DESCRIPTION OF THE DRAWINGS

Embodiments of the invention will now be described, by way of example only, with reference to the accompanying drawings of which.

DETAILED DESCRIPTION OF EMBODIMENTS

Figure 1:
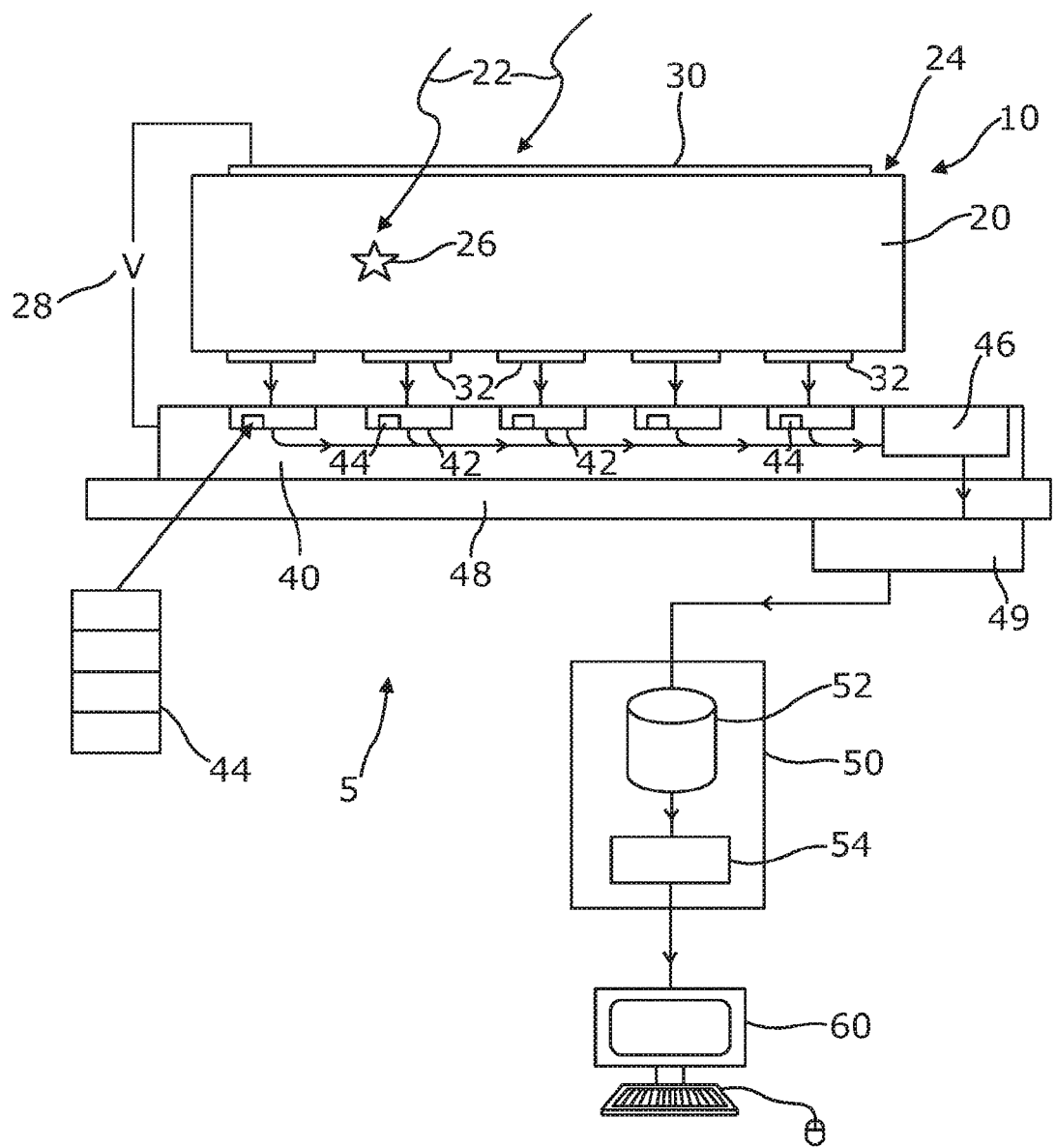
FIG. 1 schematically illustrates apparatus for detecting ionizing radiation using a pixelated semiconductor detector, and for analysing the resulting signals to determine properties of the ionizing radiation such as energy.

Referring now to FIG. 1, a schematic view is shown of a spectroscopic imaging sensor 5 for detecting particles or photons of ionizing radiation 22, such as Gamma rays or X-rays, and in particular such sensor which can output information about spectral properties of that radiation with lateral position information, for example in the form of a pixelated image. Typical uses for a spectroscopic imaging sensor of ionizing radiation such as that of FIG. 1 are situations where spectroscopic X-ray imaging is required, for example in medical, security, astronomy, and industrial imaging areas.

The sensor 5 includes a detector portion 10 and an application specific integrated circuit 40 (ASIC) arranged to process electrical signals from the detector 10. The detector comprises a semiconductor layer 20 into which ionizing radiation 22 to be detected enters at a front face 24 of the layer 20. At least some of the ionizing radiation interacts with the material of the semiconductor layer 20, for example at interaction event 26, to generate electrons and holes which are then swept by a bias voltage 28 towards an anode side and a cathode side respectively of the semiconductor layer 20. In this way the semiconductor layer provides for a direct conversion detector of the ionizing radiation.

In the example of FIG. 1 the cathode side is provided by the front face 24 of the layer 20, at which a single planar cathode 30 is provided, although this cathode could be provided using multiple electrically connected cathode segments, or could be pixelated in some way to provide multiple separate cathodes. In FIG. 1 the anode side is provided with an array of pixel anodes 32 disposed at a rear face 34 of the semiconductor layer 20 to thereby define pixels of the detector 10. As will be familiar to the person skilled in the art, such an array of pixel anodes permits a lateral position within the semiconductor layer 20 of an interaction event 26 to be detected. The anode side may also be provided with a continuous guard band electrode (not shown in the figure) around the outside of the anode pixel array, to help reduce the effects of the lower resistance of the crystal edges which can otherwise lead to significant leakage currents.

Although a pixelated array of anodes 32 at the rear face 34 and a single planar cathode 30 at the front face 34 are shown in FIG. 1, depending on the semiconductor material used and other configurations and desired performance of the detector, pixelated cathodes could also or instead be used, and/or the anode(s) and cathode(s) could instead be provided on front and rear faces of the semiconductor layer respectively, for example in the case of a small pixel Germanium detector bonded to the ASIC. Similarly, although the detector may typically be used with ionizing radiation entering at a front face of the detector as illustrated in FIG. 1, rear illumination could be used if desired, with various configurations of anode and cathode structures.

A variety of different semiconductor materials may be used for the semiconductor layer 20, depending on the required properties of the detector 10, for example depending on the types and energy ranges of ionizing radiation which are to be detected, the size and number of pixels for the detector, and so forth. Cadmium Telluride or Cadmium Zinc Telluride may be selected, for example because these materials have sufficiently low conductivities for larger thicknesses of detector (for example of the order of 5 mm or more) to be operated effectively at room temperature, but sufficiently high collision cross sections to photons of higher energies, for example from several tens of keV to several MeV. Silicon, gallium arsenide, or diamond may conveniently be used for lower energy ionizing radiation. Germanium may be used if very low temperatures, for example cryogenic, can be easily maintained in order to reduce the material conductivity to acceptable levels. Other suitable materials for the semiconductor layer may include mercuric iodide, thallium bromide, and organic-inorganic trihalide perovskites could be used at higher energies The semiconductor layer is preferably provided as single, integral layer of a single semiconductor material, preferably as a monolithic or single crystal layer in order to provide acceptable levels of trapping and mobility of electrons and holes within the material, by avoiding gross structural defects that have a negative effect on the detector performance due to carrier trapping and warping of the electric fields around such defects. If a single and unbroken layer of the material is thereby provided, without insulation or division to form separate pixels within the material, any particular radiation interaction event 26 can lead to induced electrical signals and charge collection at multiple pixel anodes, which may be considered a problem in the prior art, but which the inventors have realised can be used to advantage, as discussed in more detail below.

The dimensions and geometry of the semiconductor layer 20 and the array of pixel anodes may be adapted according to the desired field of application and other factors, but typically a semiconductor layer of CdTe or CdZnTe with a thickness of about 5-10 mm, and rectangular lateral dimensions of around 10-50 mm in each direction may be used, with a pixel pitch (distance between pixel anode centres) of around 500 μm on a rectilinear grid, giving a total pixel count broadly in the range $1 \times 10^2 - 1 \times 10^5$. Some suitable such parameter ranges for embodiments of the invention may be a semiconductor layer thickness in the range 1-20 mm, and a pixel pitch in the range 50-5000 μm. The pixel arrangement may be a rectangular or square grid, more generally a rectilinear grid, or may use other grid forms such as hexagonal. Typically, a detector 10 according to embodiments of the invention may be described as a small pixel detector, in which the thickness of the semiconductor layer between the cathode and anode sides is significantly greater than the pixel pitch, for example at least by a factor of 2, and more preferably by a factor of 3, 4 or more.

As also shown in FIG. 1, the pixel electrodes, which are anodes 32 in this example, are instrumented for detection of interaction events 26 by electrical connection to an application specific integrated circuit (ASIC) 40 which comprises a plurality of pixel circuits 42. Each pixel circuit is arranged to receive an electrical pixel signal from a different corresponding one of the pixel anodes 32, and to analyse that signal over a detection period to derive a set of attributes 44 describing aspects of the signal during that detection period. The set of attributes 44 is then read out at or after the end of the detection period using readout circuitry 46 of the ASIC 40, some of which may be incorporated in the individual pixel circuits if appropriate in a particular design.

A suitable detection period may be selected depending on other aspects of the detector 10 such as sensitivity, pixel numbers and sizes, detector material properties (such as carrier mobilities), and the desired application for the detector bearing in mind the intensity and photon or particle energy of radiation to be detected. For example, it may be desirable for the probability of two interaction events being registered in a single pixel during a single detection period to be low, to avoid "pileup" of the signals from the two events which cannot easily be represented separately in the output attributes for that pixel and detection period. If a rolling shutter read out is used by the readout circuitry 46 with readout of a single row (or column) taking about 1 μs, then a full image frame of attribute sets 44 could be read out from 80 rows with a frame rate of up to 12.5 kHz. A suitable detection period for the detector of FIG. 1 could then be about 80 μs, although of course longer detection periods may be used if desired, for example where radiation intensity levels are lower. A suitable range of frame rates for some embodiments of the invention could be from about 1 Hz to about 100 kHz.

In particular, therefore, the detection period for a pixel may be a predefined detection or readout period defined by a schedule of predefined readout periods for the sensor, for example full frame readouts, and not by the timing for example of radiation incident on the sensor.

The attribute set 44 for each pixel and each detection period may be passed from the ASIC 40 for storage at an external device such as analyser 50 which may comprise suitable digital data storage 52 and computer processing hardware 54 implementing software for further analysis of the attribute sets 44 so as to determine characteristics of the interaction events 26, and therefore of the ionizing radiation 22 giving rise to such events, as described further below. Alternatively or additionally, the attribute set could be further analysed in whole or in part using circuitry provided as part of the detector, such as a floating point gate array.

Outputs of the analysis process, for example as one or more images or videos of such characteristics arranged according to the pixel array may then be displayed on an output device such as computer 60, or stored for further analysis and future display.

As shown in FIG. 1, the ASIC 40 may conveniently be mounted on a printed circuit board 48 providing circuitry 49 external to the ASIC for controlling the ASIC and assisting with data readout to analyser 50 or another external data handling device. A modular approach could also be used such as that described in M. D. Wilson et al., Journal of Instrumentation, Volume 10, October 2015. "A 10 cm×10 cm CdTe Spectroscopic Imaging Detector based on the HEXITEC ASIC".

The assembly of detector 10, ASIC 40, and optionally PCB 48 may also be provided with a heat sink (not shown in the figure) for maintaining an acceptable working temperature of the components of the sensor 5.

The electrical signal received at each pixel circuit 42 from a corresponding anode 32 of the detector 10 is typically in an analogue form, and each pixel circuit 42 will typically derive the attribute set 44 for a particular detection period using analogue electronics of the ASIC 40. However, once the attributes have been derived, they may conveniently be digitised either on the ASIC 40 itself, typically as part of the readout circuitry 46 or elsewhere, in circuitry 49 of the PCB, or at the analyser 50 or another external device, before digital data storage and/or further analysis.

The pixel pitch of the anodes may preferably match the pitch of the pixel circuits on the ASIC to which they are to be connected (although note that it is not necessary for all pixels to be connected, or for all pixel circuits to be used). In this case, the ASIC may be mounted in direct confrontation with the array of pixel anodes 32, for example by flip-chip bonding the ASIC to the detector 10. This technique can be implemented for example by providing a gold stud on an input pad of each pixel circuit 42 of the ASIC, and glue dot of low temperature silver loaded epoxy on the corresponding pixel anode 32. The ASIC and detector are then aligned and brought together under a small pressure and cured at an elevated temperature, for example of less than 150° C. to avoid structural damage to the semiconductor layer if CdTe or CdZnTe is being used. Other bonding techniques such as cold-weld indium bonding could be used.

The ASIC may instead be coupled to the detector 10 using other techniques such as an array of flexible coupling wires, and other arrangements. For example, an interposer structure could be used to convert between different pitches of the detector pixels and the ASIC pixels.

Figure 2:
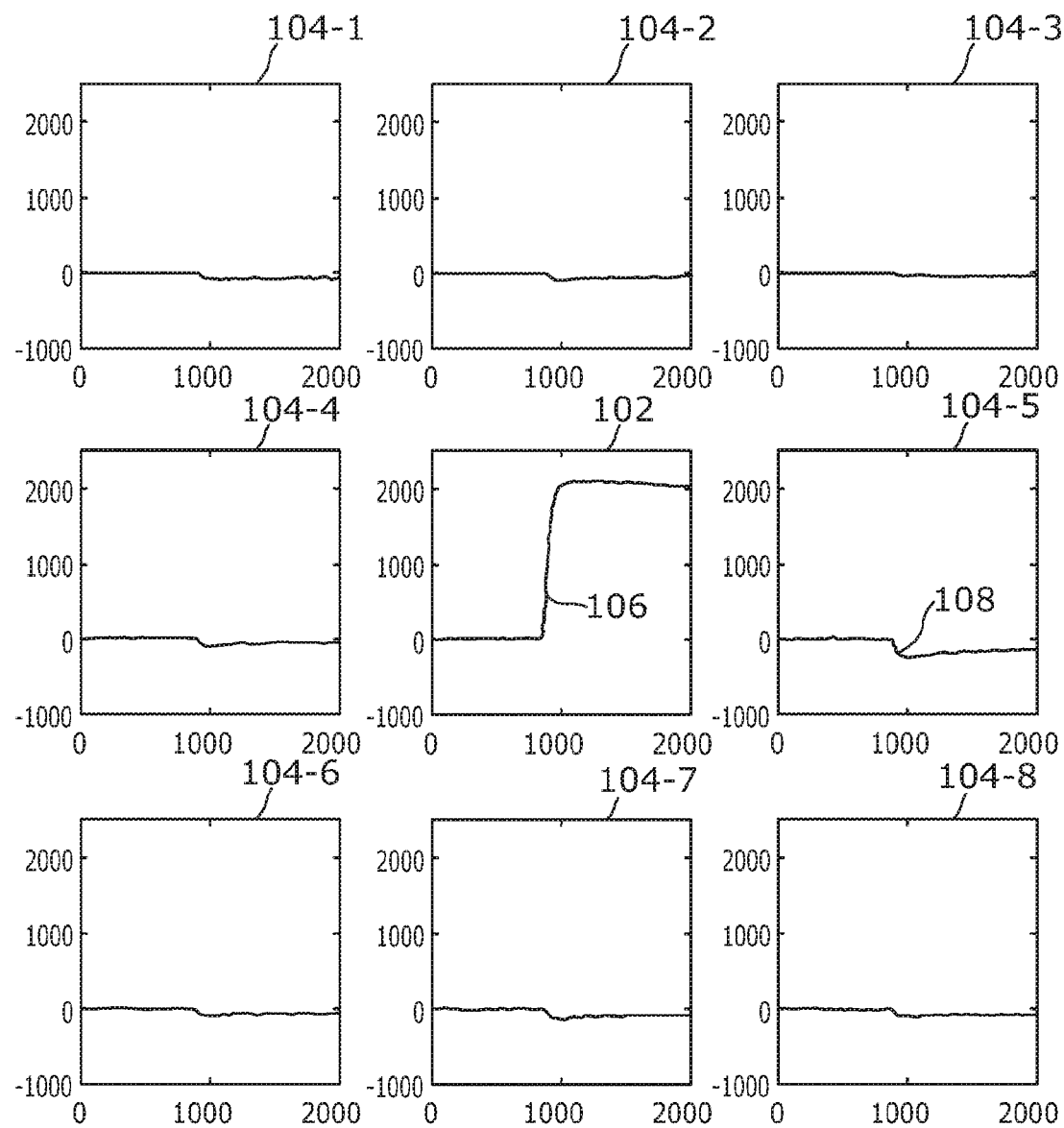
FIG. 2 shows graphs of electrical signals from a central pixel at which a radiation interaction event occurs, and simultaneous signals from adjacent pixels.

In order to better explain the invention, FIG. 2 shows analogue electrical pixel signals output from a group of nine adjacent pixel anodes 32 of a detector 10 such as that of FIG. 1, with the position of each graph corresponding to the relative position of the corresponding pixel. The signals were collected by an analyser capable of reading out continuous time dependent signals from each these pixels over at least a short time interval. This is in contrast with the ASIC 40 of FIG. 1 which is adapted to extract only a limited attribute set of data values for each pixel and each detection period.

Each graph of FIG. 2 has a timescale of zero to 2000 nanoseconds, and the ordinate represents the voltage output of a charge-sensitive amplifier which has subsequently been digitized. The detector 20 in this case was provided with a semiconductor layer of CdZnTe with a thickness of 2 mm, and was irradiated with a Co-57 gamma ray source with emissions at 122 keV and 136 keV. At these energies, the average depth of interaction within the material being used for the semiconductor layer is about 1.8 mm and 2.4 mm respectively.

The positive step feature 106 of the central pixel 102 of FIG. 2 corresponds to charge build up at the anode of this central pixel following an interaction event of such a gamma ray with the semiconductor layer within the effective pixel volume. It can also be seen that there are rather smaller negative step features 108, coincident in time with the positive step feature, in each of the adjacent pixels 104-1 . . . 104-8. Although these features are individually much smaller than the positive step feature, in FIG. 3 the signals from the adjacent pixels have been summed (labelled as Neighbour Signal) and it can be seen that the summed negative step features together are smaller than, but of broadly similar magnitude to the positive step feature.

It is widely understood in the related prior art that the magnitude of a positive step feature 106 in a pixel signal is indicative of the energy of an interaction event within the corresponding pixel, and that this magnitude can also be somewhat dependent upon the depth of the interaction event within the detector, for example see the He et al. reference above, "Position-sensitive single carrier CdZnTe detectors", Nuclear Instruments and Methods in Physics Research A 388 (1997) 180-185.

The present invention relates to the additional observation by the inventors of the illustrated negative step features in adjacent pixels, and the additional observation that these negative step features 108 are also dependent upon the depth of interaction. The inventors have established that these negative step features 108 can be used to make a correction to the energy of an interaction event corresponding to the positive step feature in the central pixel 102.

Although the invention is not limited to any particular physical mechanism, or the correctness of any theory used in understanding the negative features and their relationship to the positive feature in the central pixel and the related interaction event, the inventors understand that the formation of the negative features in adjacent pixels 104-1 . . . 104-8 is due to a combination of depth of the interaction event within the semiconductor layer (where in this arrangement "deeper" is closer to the pixel anodes), and hole lifetime in the semiconductor material which is much shorter than that of the electrons. For radiation energies such as the Co-57 emissions at 122 keV and 136 keV used in the present demonstration, there is a high probability that the depth of interaction will be close to the pixel anodes. Since there is no physical or electrical boundary between the material of the pixel volumes within the semiconductor layer 20, the weighting potentials of adjacent pixels overlap. Additionally, the gradients of the anode pixel weighting potentials are much higher closer to the anode pixels than they are close to the cathode.

Figure 4:
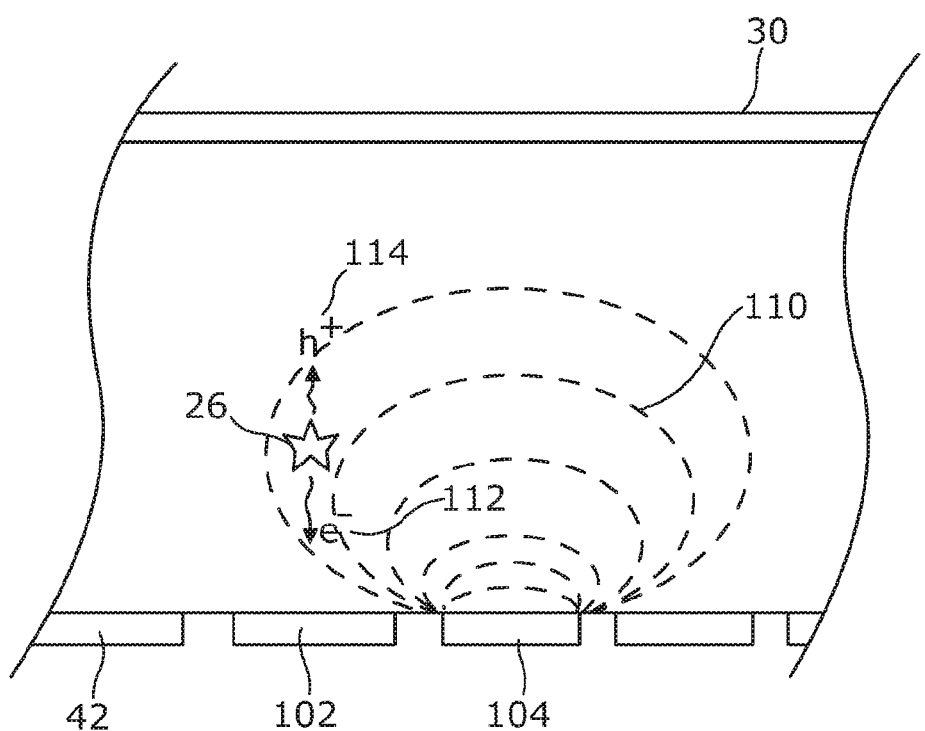
FIG. 4 illustrates the movement of a charge cloud, following a radiation interaction event, within the weighting potential of an adjacent electrode.

As illustrated in FIG. 4, an interaction event 26 and subsequent charge drift detected as a positive step feature by a central anode 102 also means that there is significant drift of the same charge through the weighting potential 110 of an adjacent or nearby anode 104. With good transport characteristics of both electrons 112 and holes 114, if no charge trapping of electrons and holes is experienced, the resulting signal on the adjacent anode 104 would sum to zero, but the poorer charge transport of holes in the semiconductor material in practice instead gives rise to a significant negative feature in the signal, due to trapping of holes close to the pixel where the weighting potential of the neighbouring pixel has a higher magnitude.

Figure 3:
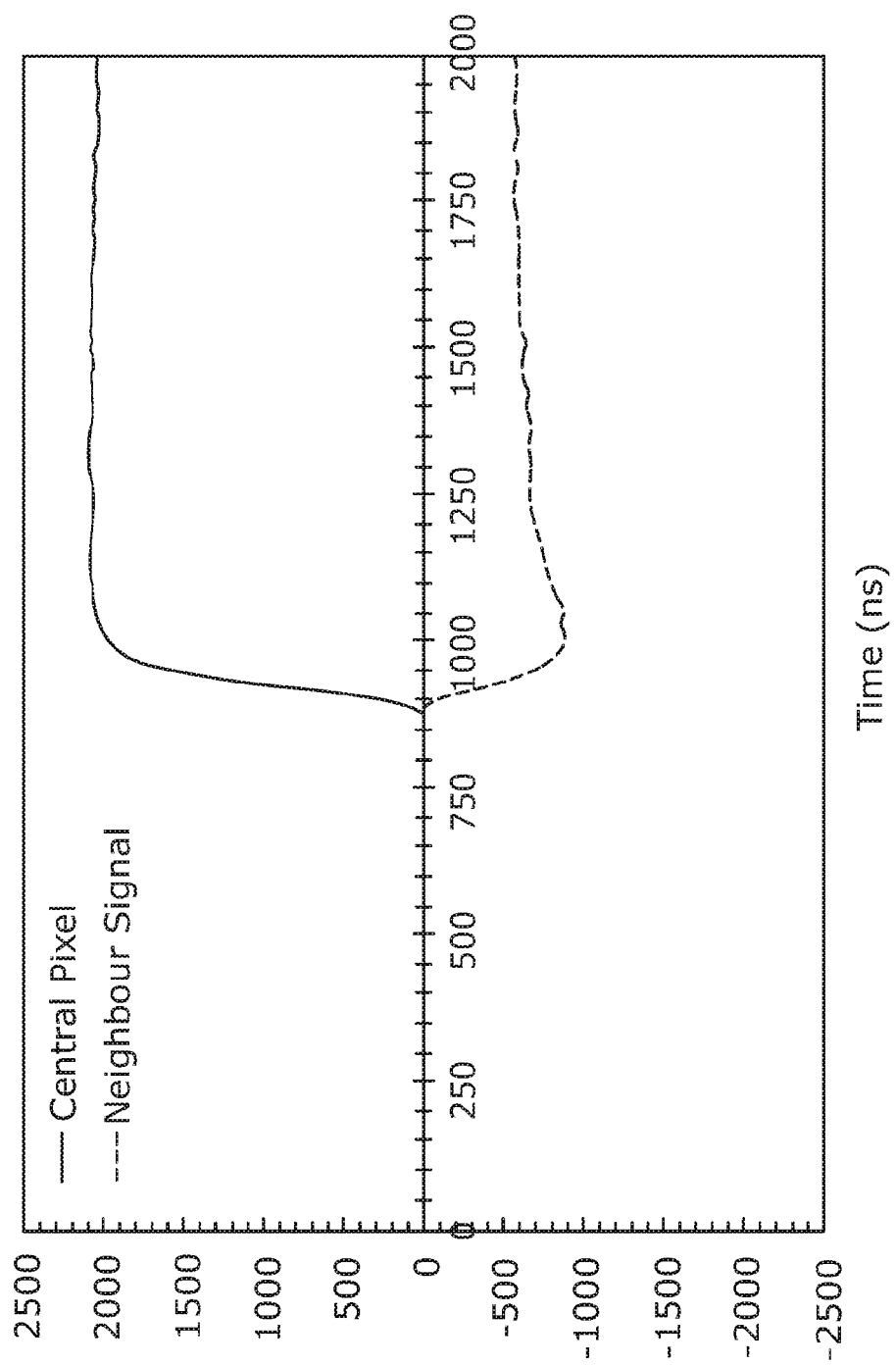
FIG. 3 shows a graph of the central pixel signal of FIG. 2 along with a sum of the signals from the adjacent pixels.

It should be noted that although FIGS. 2 and 3 show, by convention, positive anode signal features 106 corresponding to a conventional detection of an interaction event in a central pixel, the actual polarity of the electrical signal arising at the corresponding pixel anode may be electrically positive or negative, depending on the materials and configuration of the detector 30, and the particular aspect of the electrical signal which is being observed. When the term "positive" is used in this document to refer to a signal feature, it is therefore to be understood that this refers to the direction or polarity of the main signal feature observed as a result of an interaction event in a central pixel, and when the term "negative" is used, it is to be understood to refer to the opposite direction or polarity. In other words, "positive" refers to the direction of the primary signal of interest which is usually used to form the detector output representing energy of an interaction event.

Furthermore, although the positive and negative signal features 106, 108 seen in FIGS. 2 and 3 take the form of a rising step or steep ramp features which then appear to very slowly decay back towards a null or zero level for example due to properties of the preamplifier or other circuitry aspects, corresponding aspects of a pixel signal arising from an interaction even may take the form of a short pulse (for example if current is measured rather than charge or voltage) or other forms.

In light of the above discussion, embodiments of the invention provide methods and apparatus which detect the magnitude of a positive feature in a pixel signal received from a first pixel electrode (the central pixel electrode in the above discussion), the positive feature resulting from an interaction event of ionizing radiation with the semiconductor layer 20, detecting the magnitudes of corresponding negative features in pixel signals received from a plurality of pixels adjacent or proximal to the first pixel (the adjacent pixels in the above discussion), where the negative features arise from the same interaction event, and determining a characteristic of the interaction event from the magnitudes of both the positive feature and the corresponding negative features.

The above aspects of the invention may be implemented at least partly in each pixel circuit 42 of the ASIC 40, in particular so as to detect magnitudes of particular positive and negative features efficiently, and optionally to ensure that these positive and negative features are correctly associated with each other. However, the above aspects will usually also be implemented at least partly in further analysis of the magnitudes of the detected positive and negative features. This further analysis can usually be more conveniently implemented in analysis software for example executing on computer processing hardware 54 in an analyser 50 as illustrated in FIG. 1, or could be implemented at least in part using a field programmable gate array.

To this end, embodiments of the invention provide each pixel circuit 42 of the ASIC 40 with analogue processing functionality to detect both positive and negative features in the electrical signal received from the corresponding pixel, where a positive feature such as a positive step typically results from an interaction event 26 which occurs within the pixel volume of that pixel, and a negative feature such as a negative step typically results from an interaction event 26 which occurs in the pixel volume of an adjacent pixel to that where the negative feature is detected. For an interaction event 26 which occurs close to the boundary or boundaries of two or more pixels, a positive response may be seen in all of those two or more pixels, and such responses may be dealt with appropriately in analysis software for example executing in analysis software. For example, such responses may be used to provide a sub-pixel resolution calculation as described below using a centre-of-mass technique. It may also be possible to correct for any charge loss that may occur in the inter-pixel region.

Figure 5:
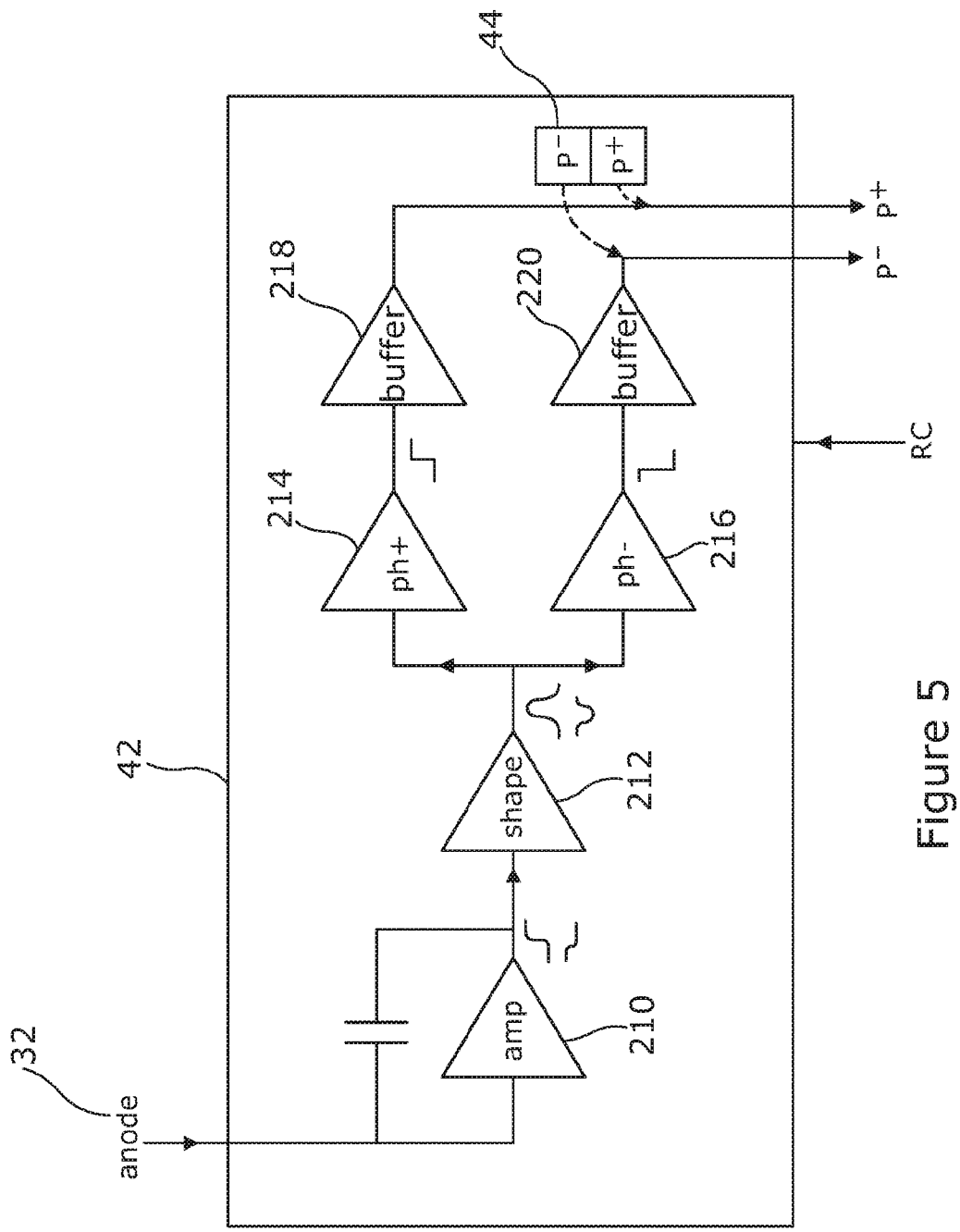
FIGS. 5 and 6 are schematics of two ways in which a pixel circuit 42 of FIG. 1 may be implemented.

One example of a suitable pixel circuit 42 is shown in FIG. 5. The electrical signal from a pixel anode 32 is received at preamplifier 210, which passes the amplified signal to a shaper circuit 212. One intended function of such a shaper circuit 212 is to improve the signal to noise ratio. Another function in the arrangement of FIG. 5 is to convert the positive or negative step feature in the amplified anode signal into a corresponding positive or negative peak in the signal output from the shaper circuit 212. Such a peak will be a positive peak if the original step feature was positive, and will be a negative peak if the original step feature was negative.

The shaper circuit 212 may be implemented for example using a CR-RC shaper part followed by a second-order low-pass filter. A suitable time constant for the shaper circuit may be about 2 µs for the detector arrangements described above, noting that the rise time of a corresponding step feature as illustrated in FIG. 2 is likely to be a few tens of nanoseconds, and a suitable predefined detection period could be a few tens of microseconds. The actual chosen shaping time may, in practice, result from a careful balancing of the material properties and noise considerations. Realistically, shaping times are likely to range from about 0.1 to 10 µs.

As shown in FIG. 5, the signal output from the shaper circuit 212 is then passed to both a positive peak hold circuit 214 which is arranged to detect and hold the magnitude of a positive peak, and in parallel to a negative peak hold circuit 216 which is arranged to detect and hold the magnitude of a negative peak in the signal output from the shaper circuit 212. If multiple positive or negative peaks are output by the shaper circuit 212 in a single detection period, then typically the corresponding peak hold circuit(s) may retain the magnitude of the largest of the respective peaks.

Any peak magnitude output by a peak hold circuit 214, 216 is then held until read out at or after the end of the detection period by a buffer circuit. A positive buffer circuit 218 holds any positive peak magnitude output by the positive peak hold circuit 214, and a negative buffer circuit 218 holds any negative peak magnitude output by the negative peak hold circuit 214. These buffer circuits provide a sample and hold function.

Consequently, the pixel circuit 42 illustrated in FIG. 5 provides, for each detection period, an attribute set 44 which comprises of a positive peak magnitude (which could be zero or a noise value if no positive peak occurred), and a negative peak magnitude (which could be zero or a noise value if no negative peak occurred), also indicated by outputs P+ and P− from the circuit.

Although it may be convenient to provide both a positive and a negative peak magnitude value or signal for all detection periods, with one or both of these usually taking a null or zero value, this is not necessary and instead a single peak magnitude value could be output, corresponding to either a positive or negative peak, for example with a detected positive peak always overriding a detected negative peak. Such a single output could be for example be provided using a single magnitude value and a polarity or sign flag showing whether the peak is positive or negative, and optionally also whether there is no peak detected, for example being represented by a null polarity flag.

At the end of detection period and after readout of the attribute set 44 the pixel circuit is reset ready to detect further positive and negative features of the pixel signal in the next detection period.

Figure 6:
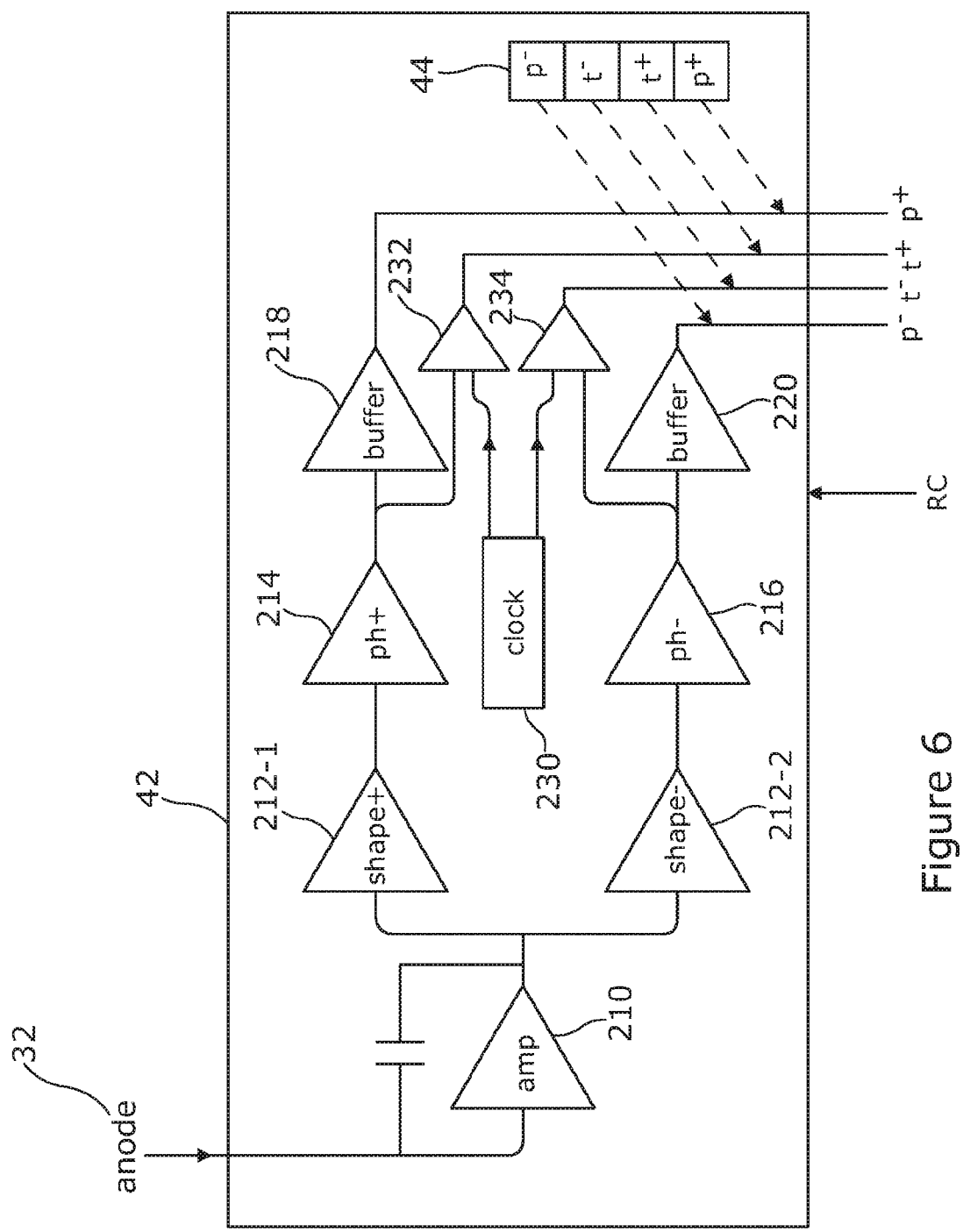

FIG. 6 is similar to FIG. 5 but additionally shows some optional variations on design of the pixel circuit. For example, the use of a single shaper circuit 212 could present challenges due to implementation of potential pole-zero cancellation or base-line restoration in the pixel, such that the use of a separate positive shaper circuit 212-1 outputting to the positive peak hold circuit 214, and a separate negative shaper circuit 212-2 outputting to the negative peak hold circuit 216, may be desirable.

FIG. 6 also shows how one or more time stamp circuits 232, 234 may be provided to output time stamps of any detected output peaks in a particular detection period. In FIG. 6 a positive time stamp circuit 232 detects when a positive peak has been detected by the positive peak hold circuit 214, and uses input from a clock element 230 to output a positive peak time stamp T+. Similarly, a negative time stamp circuit 232 detects when a negative peak has been detected by the negative peak hold circuit 214, and uses input from a clock element 230 to output a negative peak time stamp T+. The clock 230 could, for example, provide a ramp signal such as a steadily rising voltage over the duration of the detection period, so that the time stamp T+ or T− is a value of that ramp signal at the time of detection of the corresponding positive or negative peak. If no peak is detected then each time stamp output may retain a null or zero value, or a time stamp representing a positive and/or negative peak based on background noise may be output.

Accordingly, in the arrangement of FIG. 6 the attribute set 44 output by the pixel circuit may typically contain four values: a positive peak magnitude, a positive peak time stamp, a negative peak magnitude, and a negative peak time stamp. Various ways of representing these values may be used. The time stamp values may be used, for example, to allow analysis of the detected peaks to determine if a positive peak in one pixel occurred at the same time as a negative peak in an adjacent or proximal pixel, thereby indicating that both the positive and negative peaks resulted from the same interaction event. Other uses are also described later in this document.

Figure 7:
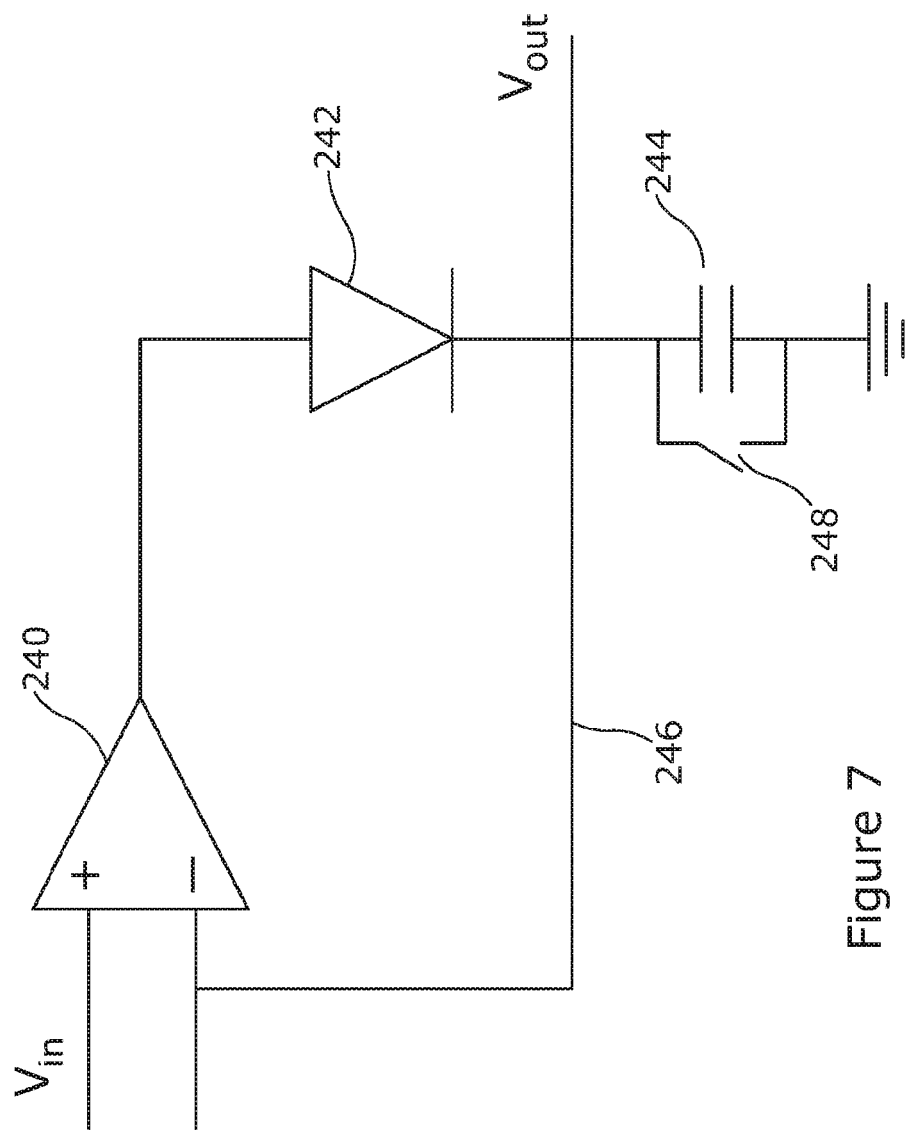
FIGS. 7 and 8 show how the positive and negative peak hold circuits of FIGS. 5 and 6 may be implemented in more general terms.
Figure 8:
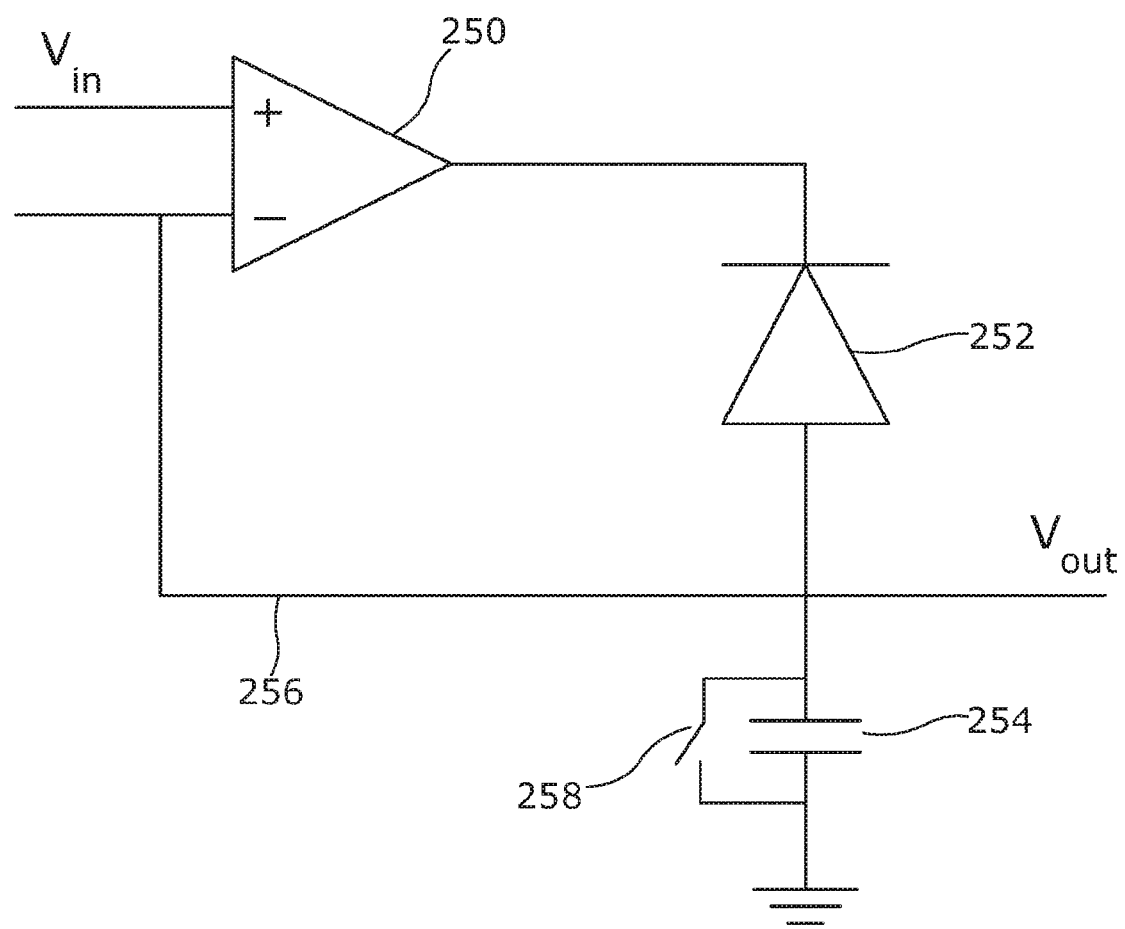

Suitable implementations of positive and negative peak hold circuits for implementing embodiments of the invention are illustrated in FIGS. 7 and 8 respectively. In the positive peak hold circuit of FIG. 7, a $V_{in}$ signal is received from either the shaper circuit 212 of FIG. 5 or the positive shaper circuit 212-1 of FIG. 6, and the circuit is configured to track and hold the peak of pulses from the shaper circuit formed by the drift of electrons to the pixel anode. At this point in the circuit it is assumed that the electron signal is represented by a positive peak in $V_{in}$.

In the positive peak hold circuit of FIG. 7 the $V_{in}$ signal is received at the non-inverting input of a high gain amplifier 240. As the magnitude of $V_{in}$ increases, so the output of the amplifier rises but with higher amplitude. This in turn causes a current to flow through the diode 242 (which may instead be implemented as a diode-connected transistor array), and this in turn increases the voltage across the capacitor 244. The voltage across the capacitor is then fed back through the feedback path 246 and tracks the input voltage $V_{in}$. When $V_{in}$ reaches a maximum and starts to decrease, the diode 242 is unable to pass current of the opposite polarity and so no change in observed in $V_{out}$ which is taken from the junction between the diode 242, the capacitor 244, and the feedback path 246. The voltage $V_{out}$ is stored on the capacitor 244 until the circuit is reset by closing the switch 248 connected across the capacitor, for example at the end of the detection period.

In the negative peak hold circuit of FIG. 8, corresponding components of a high gain amplifier 250, a diode 252, a capacitor 254, and a switch 258 to short circuit the capacitor and reset the circuit are used, but in this case the diode is the other way round so that output from the shaper circuit 212 of FIG. 5 or the negative shaper circuit 212-2 of FIG. 6 is connected so that a negative feature in $V_{in}$ can instead be stored as a voltage across the capacitor which is maintained until the switch 258 provides a reset action.

Figure 9:
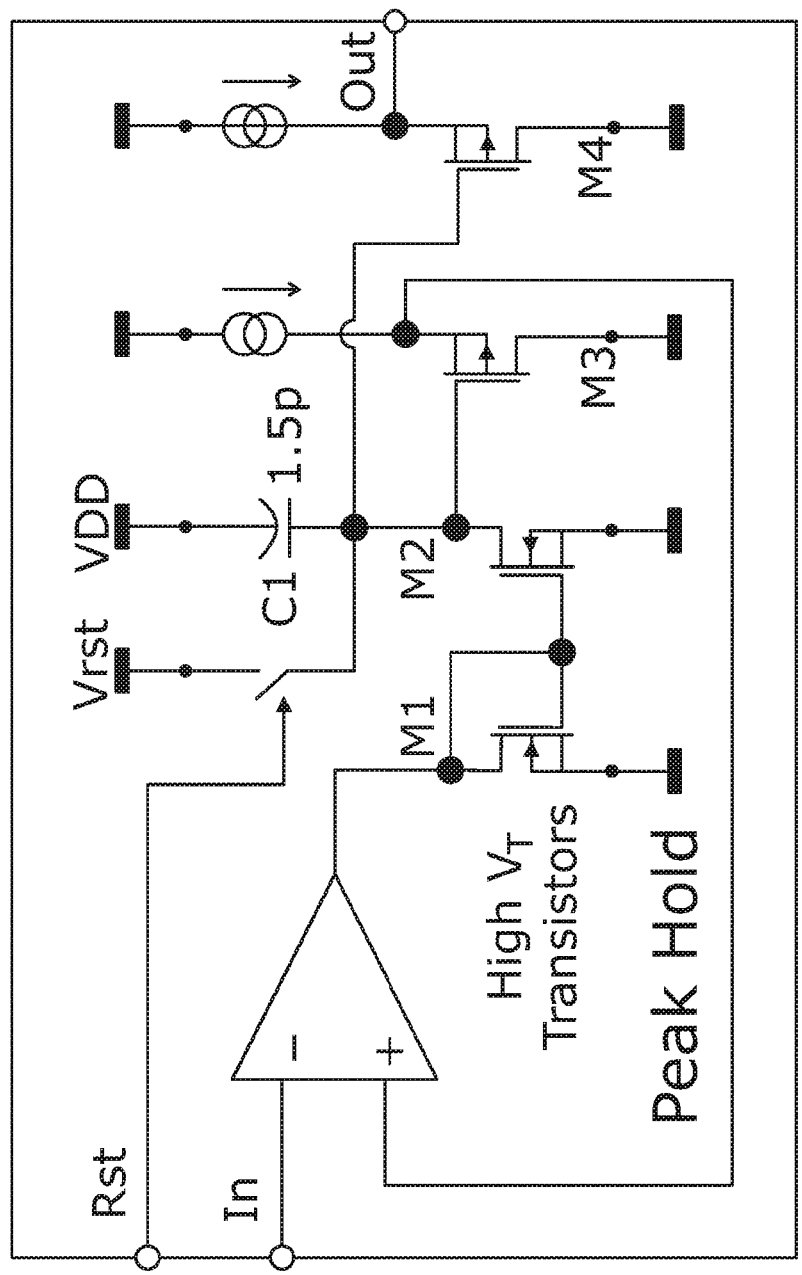
FIG. 9 is a more detailed schematic showing a circuit implementation of a suitable negative peak hold circuit.

A more detailed illustration of a typical implementation of a negative peak hold circuit 216, which may be used in a pixel circuit 42 for implementing embodiments of the present invention, is shown in FIG. 9. The peak hold circuit consists of a five transistor folded cascode op-amp with a diode connected transistor output. This circuit can be used to implement a positive peak hold circuit by swapping the inputs to the high gain amplifier 260.

The inventors have established that the magnitude of negative features in the pixel signals of adjacent pixels can be used to compensate the magnitude of the positive feature in a central pixel for depth of a radiation interaction event in the central pixel, so as to calculate a more accurate or compensated characteristic such as energy of the interaction event from the positive feature. To illustrate this technique, the results of first and second experiments will now be presented.

Figure 10:
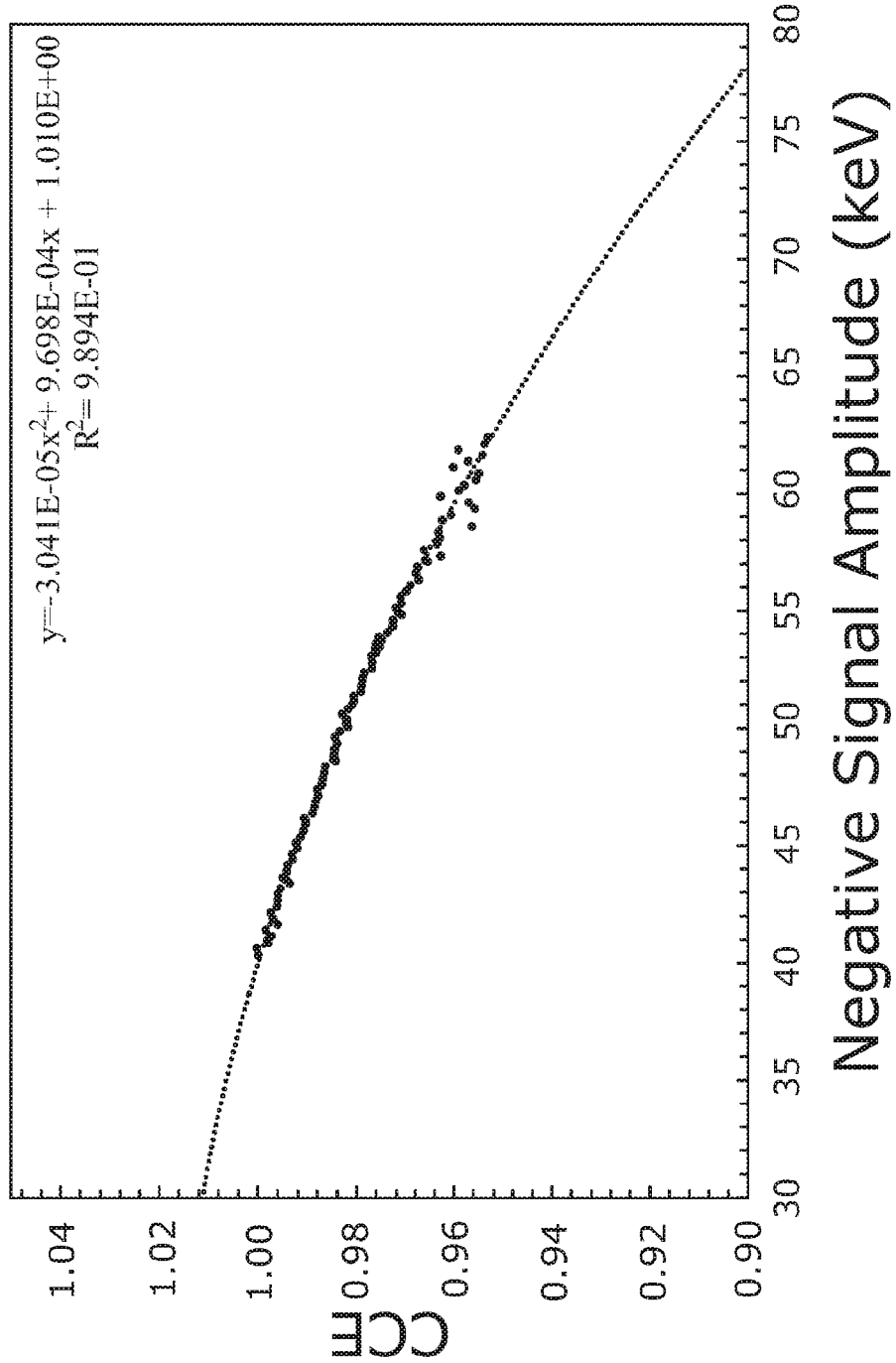
FIG. 10 plots charge collection efficiency in a central pixel against a sum of negative feature magnitudes in adjacent pixels, for 122 keV gamma rays emitted by a Co-57 source and detected by a sensor such as that of FIG. 1.

In a first experiment, a 2 mm thick CdZnTe semiconductor layer detector was irradiated with a 122 keV Co-57 gamma ray source within a sensor 5 such as that illustrated in FIG. 1. For each pixel and each detection period the magnitudes of any positive and negative features were determined and output by the ASIC 40. Since the actual energy of each photon of ionizing radiation is known as 122 keV, and this corresponds approximately to the highest possible value of the magnitude of a positive feature, the charge collection efficiency (CCE) for the interaction event 26 giving rise to each positive feature can be determined, up to a maximum value of 1.0. FIG. 10 is then a graph of this CCE plotted on the ordinate against a function of the magnitudes of the negative features detected in adjacent pixels for each same interaction event. In this case, the function is simply the sum of the magnitudes of the negative features for all eight adjacent pixels on the rectangular pixel grid.

It can be seen from FIG. 10 that the CCE for an interaction is a clear monotonic function of the summed negative feature magnitudes x, with the relationship given by the following polynomial expression, with a good regression fit factor $R^2$ of 9.894E-01:

$$CCE(x) = -3.041E-05x^2 + 9.698E-04x + 1.010E+00 \quad (1)$$

From this relationship, the determined energy of the interaction event, for a positive feature magnitude y, may be given as:

$$E = y CCE(x) \quad (2)$$

where the magnitudes x and y are already calibrated in advance, for example using a known energy source, to represent apparent energy of an interacting photon.

Of course, the function CCE(x) could take various experimental or theoretical forms, some of which may be more accurate for a particular photon energy, and some of which may be more accurate across a range of photon energies.

According to this calculation, x may be simply the summed negative feature magnitudes, but other representations may be used, for example by omitting from the sum negative feature amplitudes which are smaller than a certain threshold, using only negative feature amplitudes which are of the four perpendicular closest neighbours and omitting the diagonal neighbours, and in various other ways.

More generally, an experimental or theoretically based function may be derived or a calculation procedure defined, which applies a correction based both the magnitude y of a positive feature in a central pixel, and on the magnitudes of one or more negative magnitude features in one, more, or all adjacent or proximal pixels, and such a function may additionally include complexities such as determining which negative and positive feature magnitudes are to be used, for example including outlier rejection. For example, such a function or calculation could generally be written:

$$E = E(y, x_0 \ldots x_n, p_0 \ldots p_n) \quad (3)$$

where $x_i$ is the magnitude of a negative feature of a pixel at position $p_i$.

Figure 11:
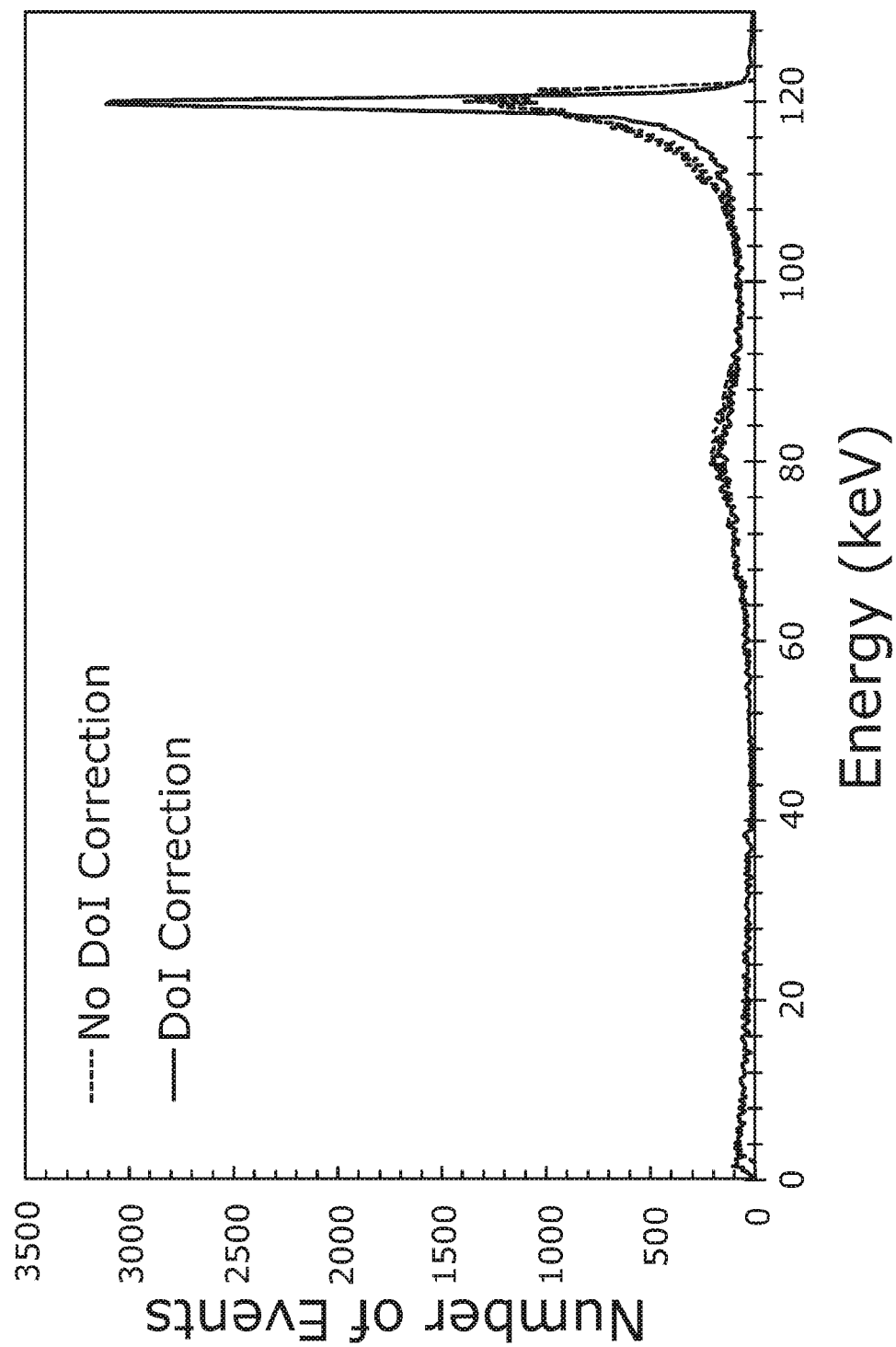
FIG. 11 plots an energy spectrum detected according to the arrangement used for FIG. 10, showing the uncorrected energy spectrum, and the spectrum corrected using negative features in adjacent pixels to correct for the effects of depth of interaction on the positive features.

FIG. 11 shows a spectrum of energy of interaction events in the experimental arrangement used for the data of FIG. 10, where the abscissa is energy in keV, and the ordinate is a count of events in particular energy bins. The data for the heavy curve labelled "CSD" was calculated without any compensation for depth of interaction using negative features, by multiplying the magnitude of each positive feature y by constant m as described above. The data for the lighter curve labelled "CSD DoI" was calculated using equation (2) above using a CCE correction based on a sum x of negative feature magnitudes from the eight pixels adjacent to the pixel of the positive feature magnitude y, where the sum includes all negative feature amplitudes in adjacent pixels, and a zero for an adjacent pixel with no detected negative feature. In this particular example, no energy calculation was made for central pixels where there was also an adjacent pixel with a positive feature detection, although similar calculation schemes where more than one adjacent pixel shows a positive signal have been shown to work, for example by summing together the positive pixels to yield a total positive signal, optionally using an additional correction factor to account for charge losses between pixels. The total positive charge is then corrected using the techniques described above and below in this document. It will be seen in FIG. 11 that the definition of the expected energy peak at 122 keV has been improved considerably, with the full width at half maximum decreasing from 3.4 keV to 1.7 keV, approaching the limits of the detector electronics used in these experiments.

Figure 12:
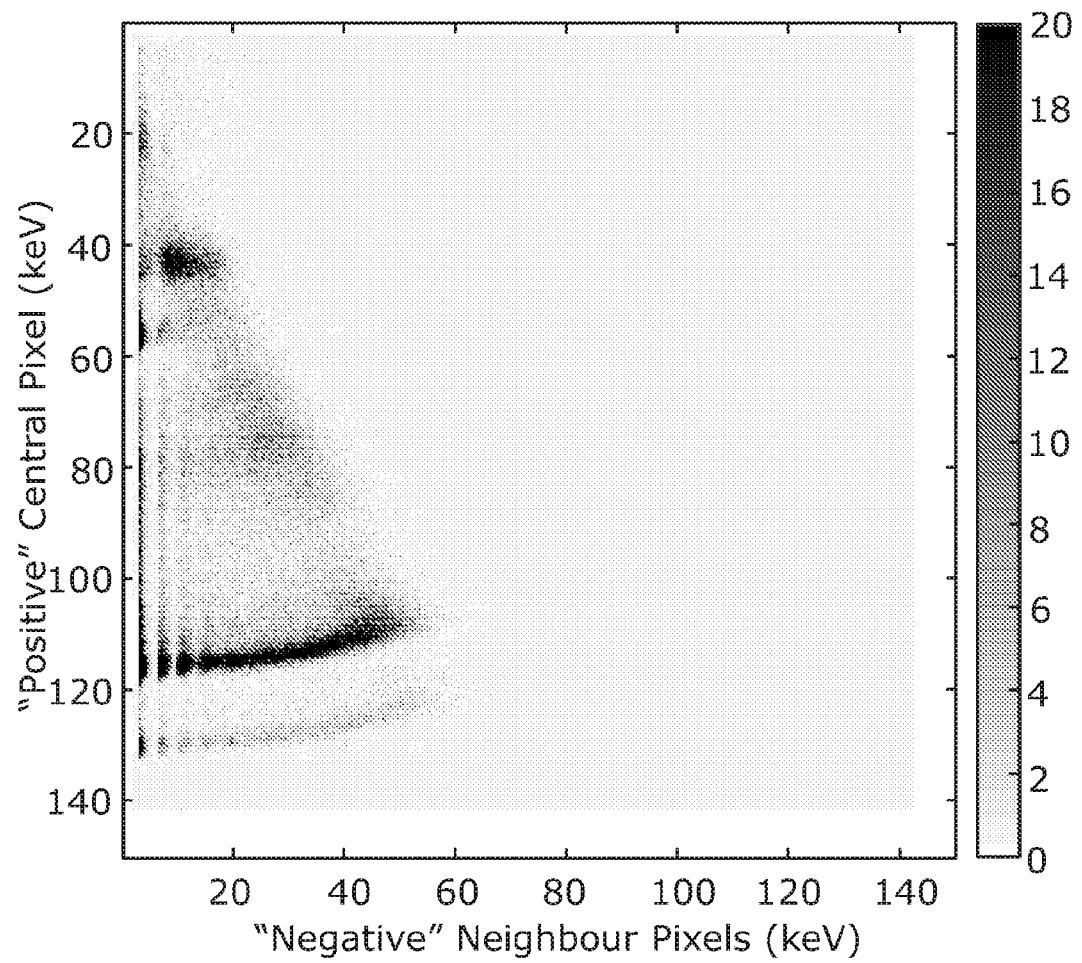
FIG. 12 plots positive feature magnitudes against sums of negative feature magnitudes in adjacent pixels (both expressed as apparent radiation energy), for 59.54 keV, 122 keV and 136 keV gamma rays emitted by Co-57 and Am-271 sources and detected by a sensor such as that of FIG. 1.

FIG. 12 is a plot of data from an experiment similar to that of FIGS. 10 and 11 in which both a Co-57 and an Am-271 Gamma ray source were used, to provide radiation at energies of 59.54 keV, 122 keV and 136 keV. In the 2 mm thick detector semiconductor layer used for this experiment the mean depths of interaction for these three energies was 0.3 mm, 1.8 mm and 2.4 mm. Following the discussions earlier in this document, it will be understood that more severe errors in energy determination due to charge loss can be expected for the 122 keV and 136 keV photons which have large penetration depths which are of the order of the thickness of the semiconductor layer, than for the 59.54 keV photons.

The ordinate of FIG. 12 represents the magnitude y of each of many detected positive features in the pixel signals, and the abscissa represents the sum x of the magnitudes of the negative features in signals from pixels adjacent to each corresponding positive feature. For convenience, these values of x and y have been multiplied by the constant m so as to provide a plot in terms of equivalent photon energy. The strong arc at around 120 keV for the positive feature magnitude represents interaction events due to the 120 keV photons, with the apparent energy dropping away as the sum of magnitudes of negative features increases. Similar features can be seen, although less clearly, for the other two photon energies. Although no clear relationship between x and y is clear for the 59.54 keV photons, for which depth of interaction is usually small so little or no correction is required, the arcs for the two higher energies are seen to be of very similar shape, indicating that a common correction scheme can be applied at a range of photon energies.

If the axes variables of FIG. 12 are each divided by the actual photon energy E, each arc of data points in FIG. 12 can be represented as an ellipse in a coordinate system where the abscissa represents x/E, and the ordinate represents CCE=y/E (where the values x and y are already based on pixel calibrations to represent apparent photon). Such an ellipse then has major and minor dimensions a and b, and is represented by the equation:

$$\frac{x^2}{a^2 E^2} + \frac{CCE^2}{b^2} = 1 \quad (4)$$

The minor dimension of the ellipse corresponds to the situation where CCE=1 where it is expected that the sum of negative magnitudes x=zero, so therefore the value of b is also 1, allowing a fit to the data of FIG. 12 based on x, y and assumed actual photon energy for a particular arc, with both of the 120 keV and 136 keV arcs of FIG. 12 giving a value for a of about 1.25. An equation for calculating the photon or particle energy from a positive feature magnitude y compensated according to the sum of adjacent negative feature magnitudes x can be provided as:

$$E^2 = \frac{x^2}{a^2} + y^2 \quad (5)$$

The fitted value for parameter a=1.25 likely reflects the geometry of the detector, and may change with the ratio of pixel pitch to detector thickness. For detector data arising from a number of different photon energies where the value of a is approximately the same for such all energies, equation (4) permits compensation for depth of interaction across a range of photon energies using only the positive feature magnitude, the sum of the adjacent negative feature magnitudes (or some other function of such magnitudes) and the factor m.

Figure 13:
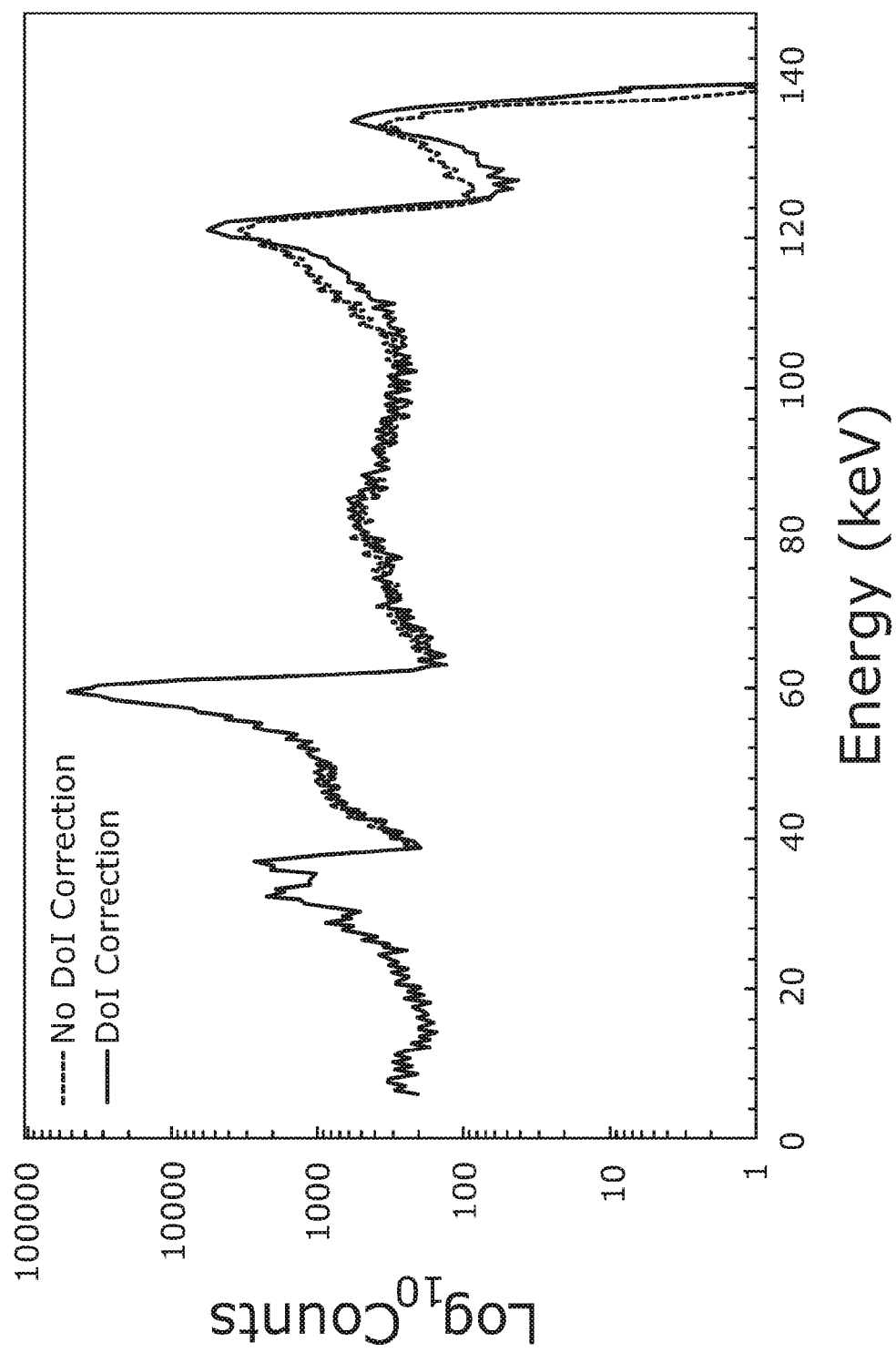
FIG. 13 plots an energy spectrum detected according to the arrangement used for FIG. 12, showing the uncorrected energy spectrum, and the spectrum corrected using negative features in adjacent pixels to correct for the effects of depth of interaction on the positive features.

FIG. 13 shows a spectrum of energy of interaction events in the experimental arrangement used for the data of FIG. 12, where the abscissa is energy in keV, and the ordinate is a count of events in particular energy bins. The data for the lighter curve labelled "No DoI correction" was calculated without any compensation for depth of interaction using negative features, by multiplying the magnitude of each positive feature y by constant m as described above. The data for the heavier curve labelled "DoI correction" was calculated using equation (5) above based on a sum x of negative feature magnitudes from the eight pixels adjacent to the pixel of the positive feature magnitude y, where the sum includes all negative feature amplitudes in adjacent pixels, and a zero for an adjacent pixel with no detected negative feature. It will be seen in FIG. 13 that the definition of the expected energy peaks at 122 keV and 136 keV has been improved considerably, with the full width at half maximum decreasing from 4.0 keV to 3.1 keV and 3.9 keV to 3.3 keV for the two energies respectively. For the 59.54 keV peak no significant increase in spectral definition is seen, because the majority of the related interaction events occur at rather shallow depths resulting in a very weak negative feature signal.

Figure 14:
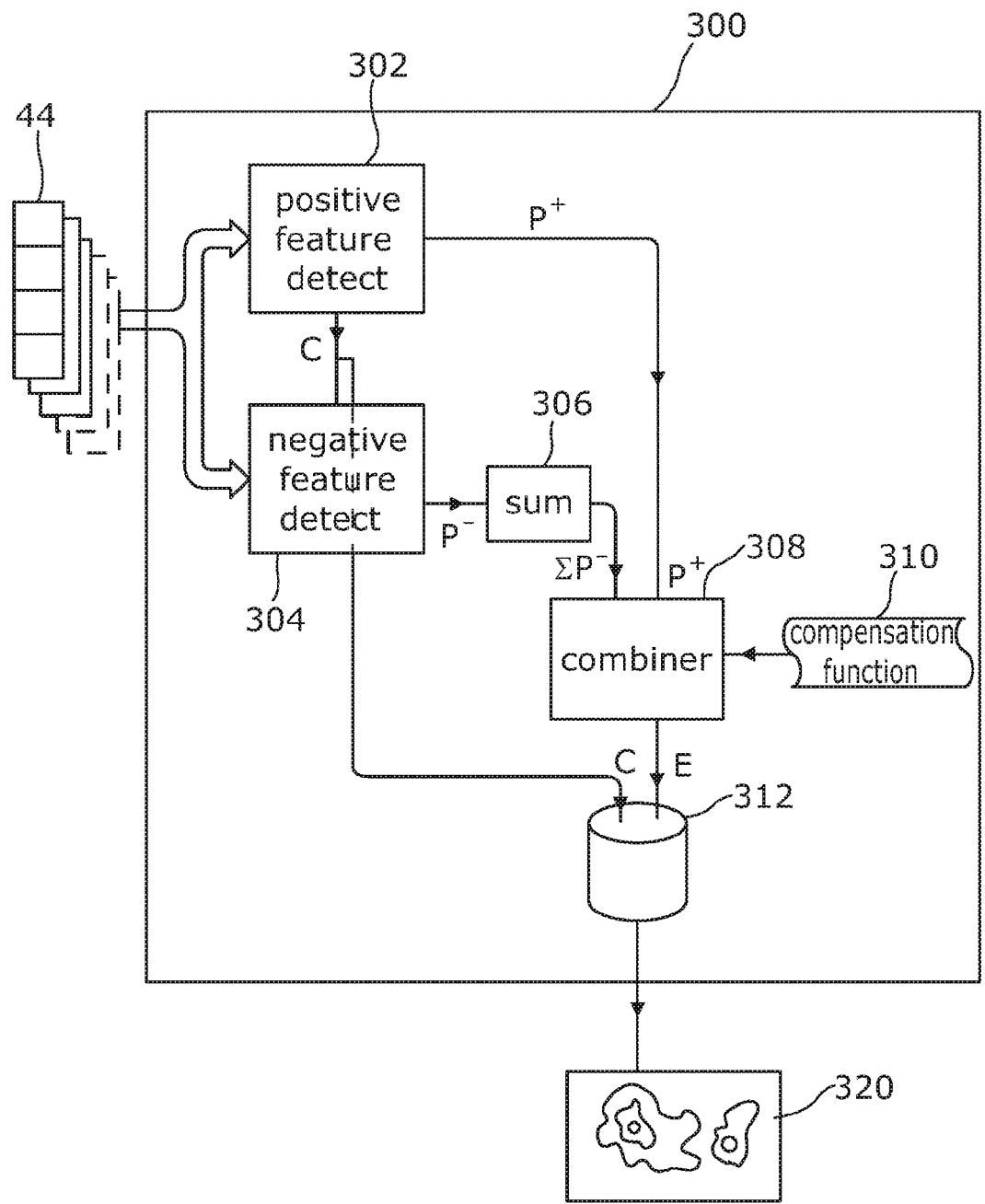
FIG. 14 schematically shows elements or processes in an analyser for calculating an interaction event energy corrected for the effects of depth of interaction on the positive features.

Referring now to FIG. 14 there is shown schematically aspects of an analyser 50 which may typically be implemented using software executing on a processor 54, and/or in a circuitry arrangement such as an FPGA, in order to determine a characteristic of each of a number of interaction events from the magnitudes of both one or more positive features detected in the volumes of the one or more pixels of the interaction event and corresponding negative features from adjacent or proximal pixels.

A plurality of sets of attributes 44, each representing a detection period for a particular pixel, are passed to the analysis process 300. The plurality of sets of attributes will typically comprise such attribute sets from a large number of pixels, for example a whole pixel array, over a large number of detection periods, for example at least several hundred and perhaps several thousand or more such detection periods. Each attribute set is associated with a particular pixel and detection period, for example by containing explicit pixel coordinate and timing data, or in implicit ways for example by position in a data structure such as an array of such attribute sets.

A positive feature detector 302 then systematically analyses the attribute sets to seek candidate positive features each of which is likely to represent an interaction event of interest in the detector 10. The positive feature detector may, for example, apply a threshold to identify candidate positive features only where a threshold magnitude of a feature is reached, only where the positive feature is not adjacent to another pixel having a positive feature in the same detection period, and so forth. In some implementations, two or more adjacent positive features may be detected and handled together, for example by summing the magnitudes of the positive features to provide a combined magnitude, optionally with a charge sharing compensation function to account for charge loss due to the sharing between two pixels. Such adjacent positive features from the same detection period may be further filtered to determine that they correspond to the same interaction event by comparing time signatures of the positive features, as already discussed above in respect of a similar determination for positive and negative features.

The positive feature detector 302 then passes a magnitude P+ of a candidate positive feature, or combination of positive features, to a combiner element 308, and position, coordinates, or other position identifier C of the pixel or pixels of the candidate positive feature to a negative feature detector 304.

The negative feature detector 304 systematically analyses the attribute sets to select corresponding negative features which arise from the same interaction event. These negative pixels will typically be expected in pixels adjacent to, or at least proximal to, the pixel or pixels of a candidate positive feature or features 304 arising from a single interaction event. Preferably these corresponding negative features should be found in the same detection period as the candidate positive feature(s), although it should be noted that depending on the readout mechanism used, these detection periods may not be precisely the same, for example being slightly offset from each other due to a rolling shutter readout. The selected corresponding negative features may also be sufficiently close together in time according to other criteria, for example based on time stamps for the positive and negative features as discussed above.

Although the search for corresponding negative features may be restricted to pixels directly adjacent to pixels where a positive feature is identified, for example contacting a positive feature either a side of that pixel, or contacting along either a side or at a corner, more distant pixels having negative features for the same interaction event may also be detected and used if desired. Such pixels may, for example, be spaced by one or more pixels away from the positive feature pixel, but be identifiable by occurring in the same detection period, and or by having a suitably similar time stamp.

If appropriate corresponding negative features are found, then details of these may be passed to a summing element 306 which sums the magnitudes p− of the negative features and passes the sum $\Sigma p-$ to the combiner element 308. If no negative features are found in adjacent pixels then a different analysis process could be used for that pixel, or a zero or null value could be passed to the combiner element 308.

The combiner element 308 operates according to a compensation function 310 to determine a characteristic of the interaction event giving rise to the candidate positive feature (or positive features in adjacent pixels arising from a single interaction event). In particular, the compensation function may be provided by equations 2, 3 or 5 above, or some variation of such equations, or some other compensation function. In particular, the determined characteristic may be an energy of the interaction event, or equivalently an energy of the ionizing radiation causing the event. However, other characteristics may be determined if desired, such as a charge collection efficiency, or depth of interaction for the event which can be calibrated from the charge collection efficiency or other function dependent on the negative features.

In FIG. 14 the output of the combiner 308 is shown as an energy E of radiation giving rise to the interaction event, and is stored in data storage 312 in a manner such that this energy can be associated with at least the corresponding pixel where the positive feature of the interaction event was detected, and preferably also a time of the event, for example by identification of the detection period.

The detected characteristics such as energy E stored in data storage 312 can then be used to provide spectral data relating to the ionizing radiation incident on the detector 10, for example by way of a spectral image 320, or multiple such images as a video sequence. It may be desirable to provide such images or video in close to real time, for example to provide a real time X-ray or gamma ray video camera for medical or other purposes, or the spectral image data may be stored for future analysis and use.

Figure 15:
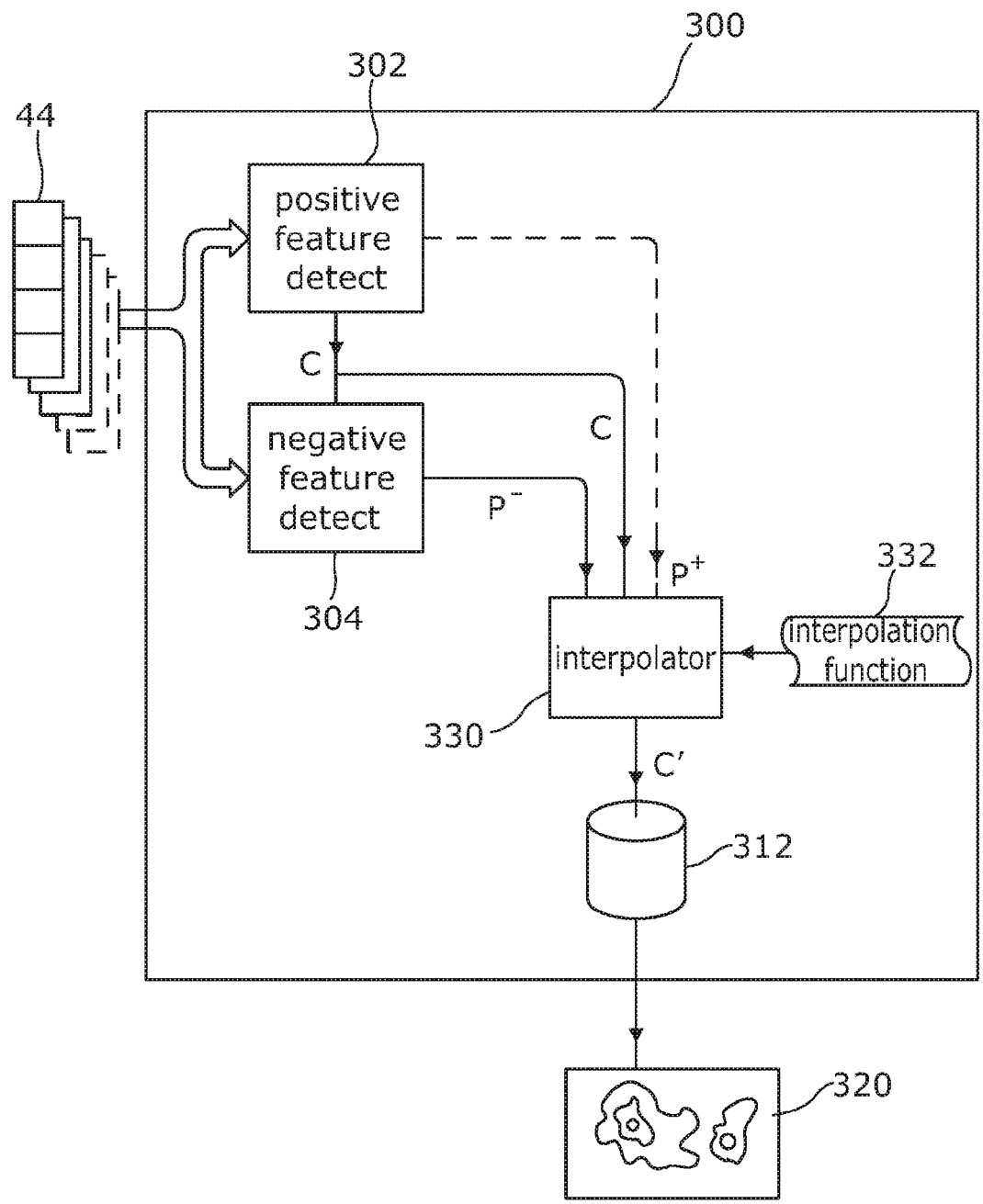
FIG. 15 schematically shows elements or process in an analyser for determining a sub-pixel position of an interaction event using negative features in pixels adjacent to the pixel in which the event occurs.

FIG. 15 shows schematically other aspects of an analyser 50 which may typically be implemented using software executing on a processor 54, in order to determine a sub-pixel position of each of a number of interaction events using the magnitudes of negative features from pixels adjacent or proximal to one or more pixels having a positive feature corresponding to the same interaction event. This functionality may be implemented as well as or instead of the functionality of FIG. 14 which is intended to determine more accurately a characteristic such as energy of the interaction event, and the aspects of FIG. 15 may make use of one or more processing elements or functions which are common to those of FIG. 14.

The inventors have observed that the magnitude of a negative feature in an adjacent pixel tends to be larger if an interaction event in a central pixel is closer to that adjacent pixel, and smaller if an interaction event in a central pixel is further away from that adjacent pixel. This can be seen from FIG. 4, where moving interaction event 26 to the right increases the degree to which the drifting charge interacts with the weighting potential of the neighbouring pixel.

A sub-pixel position of an interaction event can therefore be determined from a consideration or analysis of the variation in magnitude of negative features around the central pixel, with stronger negative magnitudes indicating closer proximity to the interaction event. Although the technique can be implemented only by considering adjacent pixels with negative magnitudes, pixels slightly further away but still proximal to the one or more positive feature pixels may also be used.

To this end, FIG. 15 also shows a plurality of sets of attributes 44, each representing a detection period for a particular pixel, being passed to the analysis process 300. As in FIG. 14 a positive feature detector 302 analyses the attribute sets to seek candidate positive features each of which alone or in combination with one or more other adjacent pixels is likely to represent an interaction event of interest in the detector 10. The positive feature detector 302 may then a pass a position, coordinates, or other position identifier c of the pixel (or pixels, since a single interaction event can give rise to positive features in two or more adjacent pixels) of the candidate positive feature(s) to a negative feature detector 304.

The negative feature detector 304, as described for FIG. 14, is arranged to find corresponding negative features in pixels adjacent or proximal to the pixel(s) of the positive feature(s). These identities or positions, and magnitudes p− of these negative features are then passed to an interpolator element 330. The interpolator element uses the negative feature magnitudes and their pixel positions to calculate a sub-pixel interpolated position of the interaction event, for example using an interpolation function 332. This interpolation function may or may not also require the magnitude(s) of the positive feature(s) as input. The interpolation function may be a "centre of mass" type correction based in the negative features, giving a position of the interaction event within the central pixel or pixels.

However, some other example interpolation functions 332 could include:
(a) a centroid of the magnitudes of all negative features in the eight adjacent pixels in a rectangular pixel grid, as an arithmetic mean position of the adjacent pixels weighted by their respective negative feature magnitudes and optionally also centre point distances from the centre of the positive feature pixel;
(b) a different geometric function defining a centroid similar to that of option (a), for example where the weights of the arithmetic mean correspond to a non-linear function of the negative feature amplitudes;
(c) either of (a) or (b) wherein only the four closest neighbour pixels are used for the centroid;
(d) any of the above where outlying negative magnitudes are excluded from the centroid calculation, for example when above a particular threshold;
(e) any of the above, wherein one or more positive features in adjacent pixels are used in calculation of the centroid, for example, where positive signal from an interaction event is shared across two or more adjacent pixels;
(f) the calculation of (e) whereby a larger block of pixels, for example including two or more adjacent pixels with positive features, and some or all pixels adjacent to those two or more pixels which have corresponding negative features are used for sub-pixel position determination.

The sub-pixel interpolated position of the interaction event may then be stored, for example in data store 312, and used in subsequent data analysis, for example to present images or videos 320 in which positions of interaction events, for example along with spectral data relating to those events such as radiation energy, are presented with improved resolution and/or position.

Figure 16:
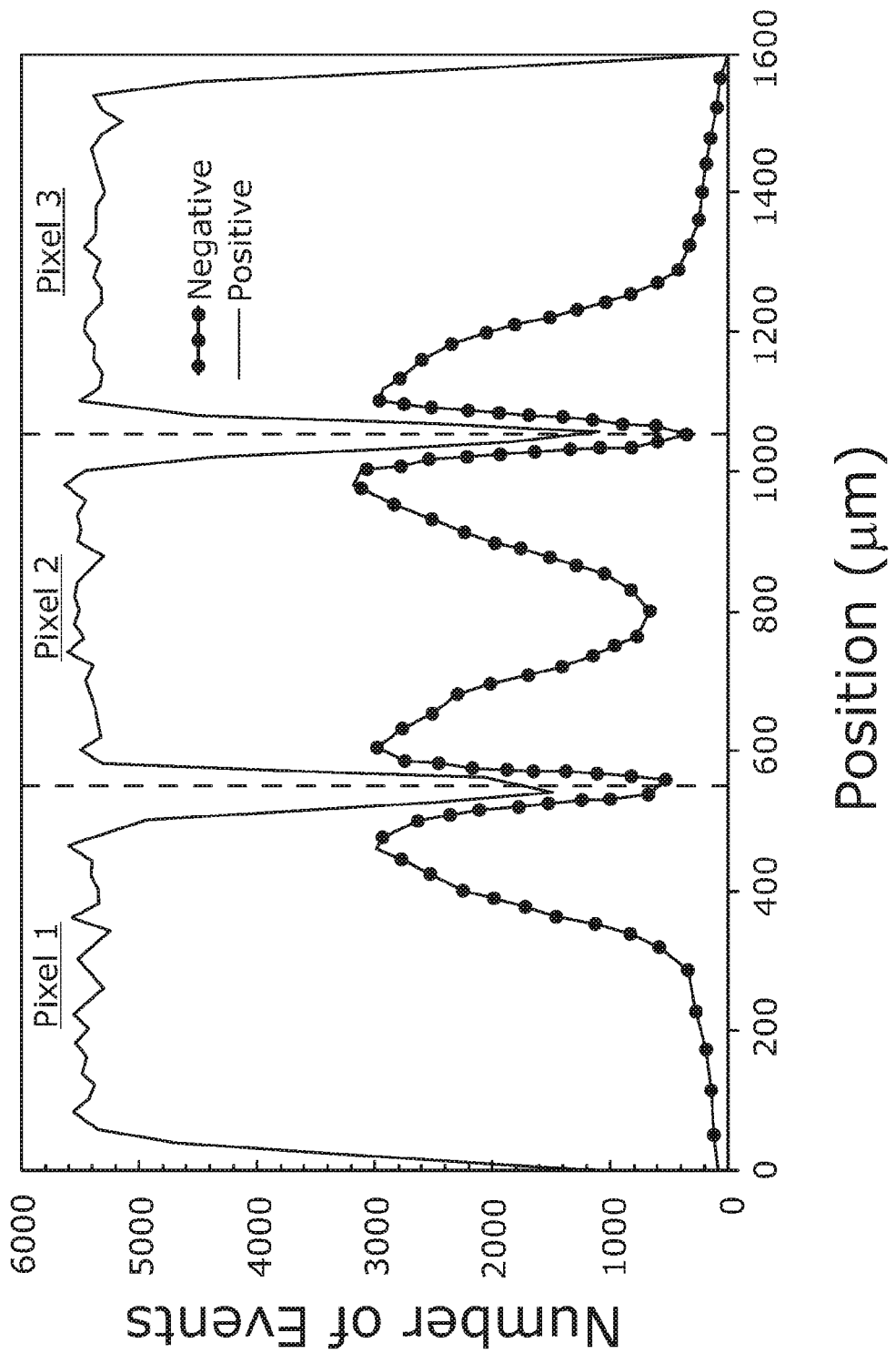
FIG. 16 shows experimental results of scanning a radiation beam across three pixels demonstrating the counts of negative and positive pixel signal features as the scan progresses.

FIG. 16 shows measurements which demonstrate the ability of the described techniques in using negative features of the pixel signals for useful sub-pixel position determination across the full width of each pixel, rather than just close to the edges of each pixel. Measurements were made with a 500 µm thick GaAs:Cr sensor with a pixel pitch of 500 µm. A 10 µm×10 µm wide beam of monochromatic 45 keV X-rays was used to scan across three pixels of the detector and the numbers of positive and negative pixel signal features from each pixel were counted. FIG. 16 only shows data for radiation interaction events detected to have occurred in a single pixel, by removing signal features for charge sharing events.

At the centre of each inter-pixel region the numbers of both positive and negative pixel signal features falls dramatically due to charge sharing events which are excluded from this data. If these charge sharing events were to be used for sub-pixel position determination then it should be observed that the region over which these occur in significant numbers is narrowly confined to the pixel boundaries.

In contrast, the negative pixel signal features display count characteristics which vary more slowly from high proximal to the pixel boundaries to low in the centre of each pixel, demonstrating that these negative features are suitable for use in improved sub-pixel position determination for events across the full width of each pixel and not just close to the boundaries.

In the pixel arrangements described above and illustrated particularly in FIGS. 5-9, positive and negative peak hold circuits are used to store either or both of positive and negative features occurring in a pixel signal, indicative of ionizing radiation interacting in that pixel, or indicative of ionizing radiation interacting in another pixel proximal to that pixel, respectively. In this way, magnitudes of positive and negative features occurring within a predetermined detection period or frame for the sensor can be stored and output at the end of the detection period.

Figure 17:
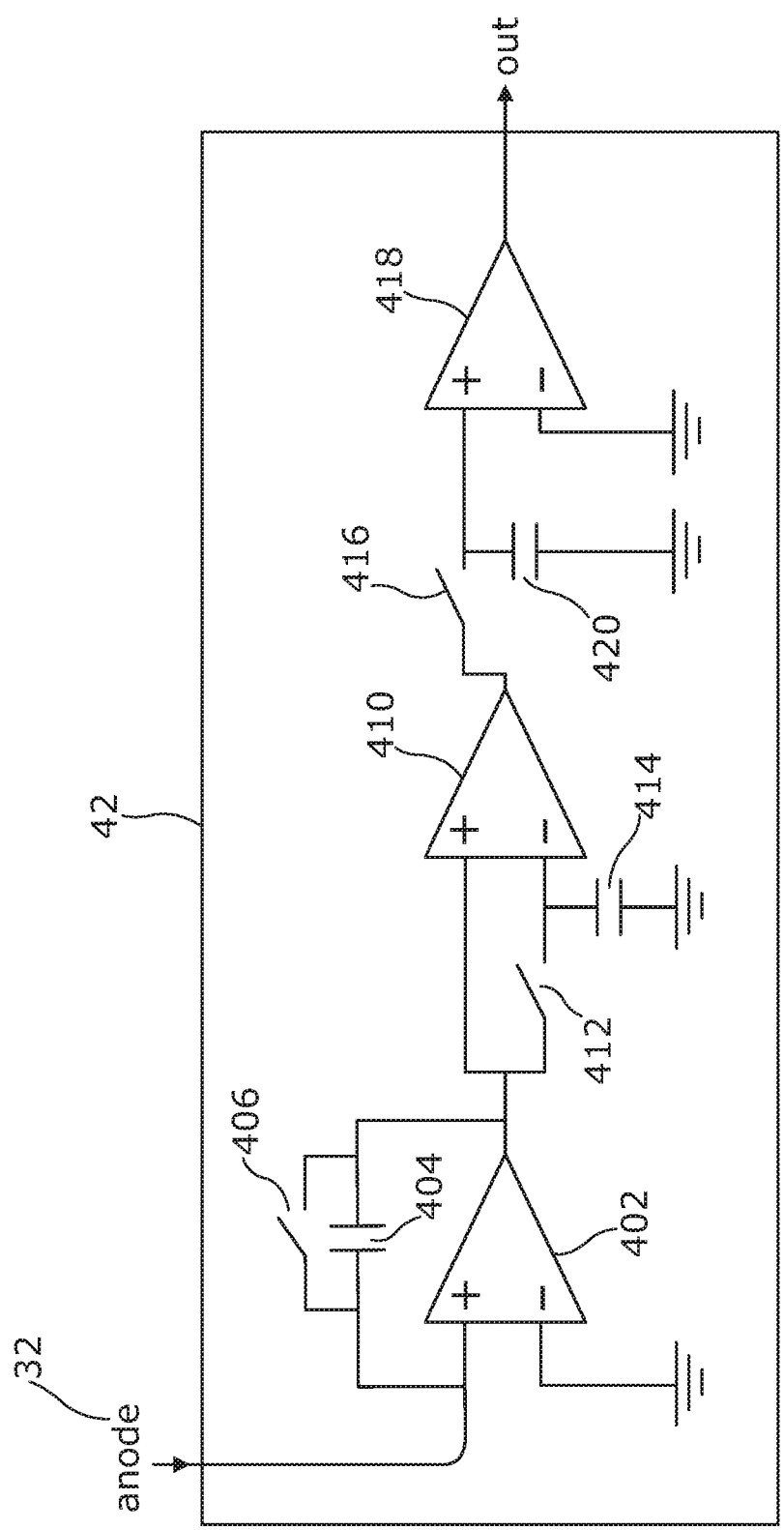
FIG. 17 illustrates an alternative architecture for the pixel circuits for use in the described sensor.

FIG. 17 illustrates an alternative pixel structure which can be implemented in each pixel circuit 42 of the ASIC 40 to provide similar functionality in providing readout of signals comprising positive and negative features as discussed above.

In general terms, this alternative pixel structure comprises in series a preamplifier stage receiving the pixel signal from the anode, a baseline compensation stage, and an output stage. The baseline compensation stage may comprise a baseline storage element arranged to receive and store the pixel signal from the preamplifier stage during a baseline interval of a particular detection period; and a comparator arranged to compensate the pixel signal input to the baseline comparison stage after the baseline interval using the pixel signal stored by the baseline storage element, and to output the compensated pixel signal to the output stage.

The baseline interval may be at or around the start of a particular detection period, and the output magnitude of any detected positive or negative feature may be provided by the output of the output stage at the end of such a detection period. To this end, the output stage of each pixel circuit may comprise a readout switch for isolating the output of the baseline compensation stage from the readout stage at the end of each detection period, so that a new detection period can begin before the output is read from the pixel circuit.

The particular pixel architecture depicted in FIG. 17 comprises a preamplifier 402 connected to a corresponding pixel anode 32 for example as already described above. A feedback capacitor 404 is connected between the output of the preamplifier 402 and the input from the pixel anode, and a first reset switch 406 is connected across the capacitor to provide a short circuit when closed. The second input of the preamplifier may be connected to ground.

The output of the preamplifier 402 is connected, in parallel, to both the non-inverting and inverting inputs of a difference amplifier 410, with the connection to the inverting input passing through a second reset switch 412, and the connection between the second reset switch 412 and the inverting input being connected to ground through a baseline capacitor 414.

The output of the difference amplifier 410 is connected, through a readout switch 416 to the input of a buffer 418, with the connection between the readout switch 416 and the buffer 418 being connected to ground through a storage capacitor 420. The output of the buffer 418 may provide a signal output of the pixel circuit 42 representative of the signal received from the anode suitably processed as discussed below.

In operation, a detection period cycle may begin with the pixel circuit in reset through the closed positions of the first and second reset switches 406, 412. The first reset switch 406 is then opened and shortly after that (for example after a period of the order of 100 ns) the second reset switch 412 is opened, thereby storing the output of the preamplifier 402 as a baseline signal on baseline capacitor 414.

At some future time during the detection period, radiation arriving at the sensor gives rise to a positive or negative feature in the signal from the anode 32, and this leads to a corresponding signal being stored on the feedback capacitor 404 reflecting the output of the preamplifier 402. Since the second reset switch 412 is open and baseline capacitor 414 is storing a baseline signal from the start of the detection period, the output of the difference amplifier 410 therefore represents a difference between the currently stored signal and the baseline signal stored on the baseline capacitor 414.

To begin readout of the pixel, readout switch 416 is closed and then opened, thereby storing the output of the difference amplifier 410 on storage capacitor 420. With this output stored a new reset of the pixel can then be started by closing the first and second reset switches 406, 412, and the signal held in the storage capacitor 420 can be read out through the buffer 418 at some point during the subsequent detection period before output switch 416 is closed to provide a new output to storage capacitor 420.

In this arrangement, the outputs from the preamplifier 402 and the difference amplifier 410, and the corresponding signals stored on the feedback capacitor 404 and the storage capacitor 420, and therefore also the output from the buffer 418, can correspond to either positive or negative features of the pixel signal received from the anode 32. This arrangement allows for rapid readout of pixel signals and may offer advantages in terms of insensitivity to short lived transient signals in the detector that might be detected using the positive and negative peak hold circuit architecture described elsewhere in this document.

In a sensor in which the pixel circuits 42 are provided as shown in FIG. 16, the detection periods of the pixels may be predefined, according to a schedule of predefined readout periods for the sensor, for example full frame readouts, as already discussed in respect of other pixel circuit arrangements such as those described above using peak hold circuits. In some embodiments, a synchronous mode of operation may be used in which the detection periods and readout process are controlled from the predetermined timing control of a radiation source used to generate a radiation beam giving rise to the ionizing radiation interactions. In such examples, a trigger signal which indicates the timing of the radiation beam may be provided to the sensor, in order to control the end of the pixel detection periods and/or the start of the readout process to occur after the incidence of the radiation beam on the sensor. Such a trigger signal may need to be in phase with a clock signal used to drive the ASIC and/or other aspects of the sensor involved in the pixel readout process to ensure that the radiation beam is not incident on the sensor during a reset phase of the operating cycle. Such timing issues can be addressed either by suitable control of the radiation source or at the ASIC itself.

Various modifications may be made to the described embodiments without departing from the scope of the invention. For example, although some detailed embodiments have been described in which a single positive feature observed from a single pixel is used to derive a characteristic of the interaction event giving rise to that positive feature by correction using negative features from adjacent pixels, some interaction events give rise to positive features in multiple adjacent pixels, and these may be combined in various ways to derive the characteristic of the interaction event instead of simply discarding events where more than one positive pixel is observed.

Similarly, although the negative features may be sought in only adjacent pixels, depending on the nature of the detector negative features from other proximal but optionally non adjacent pixels may also be used for the characteristic correction. For example, such non-adjacent negative features, and optionally also adjacent features, may be selected for use in the above correction on the basis of timestamp information or other time based data or other data processing techniques.

Although the determination of various different characteristics of an interaction event using negative signal features have been described, including particle energy, interaction depth, and sub-pixel resolution, a single sensor or system may of course implement determination of two or more of these characteristics.

The invention claimed is:

1. A spectroscopic sensor of ionizing radiation, comprising:
   a semiconductor direct conversion layer;
   an array of pixel electrodes disposed across a face of the semiconductor direct conversion layer to define pixels for detection of ionizing radiation interacting within the direct conversion layer; and
   an application specific integrated circuit (ASIC) comprising a plurality of pixel circuits, each pixel circuit being arranged to receive a pixel signal from a different corresponding one of the pixel electrodes,
   the sensor being arranged to operate according to a series of detection periods which are predetermined for the sensor, such that the detection periods are not determined by the presence of any radiation interaction with the sensor,
   each pixel circuit also being arranged, for any particular detection period for the pixel of that pixel circuit:
      to detect a positive feature, if occurring in the pixel signal, which is indicative of ionizing radiation interacting in that pixel,
      to detect a negative feature, if occurring in the pixel signal, which is indicative of ionizing radiation interacting in another pixel proximal to that pixel; and
      to output a magnitude of the detected positive or negative feature, if detected, for the detection period.

2. The sensor of claim 1 wherein each pixel circuit is arranged to output a magnitude of each of a positive feature and a negative feature if both are detected in a particular detection period.

3. The sensor of claim 1 wherein each pixel circuit comprises both a positive peak hold circuit arranged to detect and hold at its output the magnitude of a positive peak corresponding to a positive feature occurring in the pixel signal received from a pixel electrode, and a negative peak hold circuit arranged to detect and hold at its output the magnitude of a negative peak corresponding to a negative feature occurring in the pixel signal from the pixel electrode.

4. The sensor of claim 3 wherein each pixel circuit additionally comprises at least one shaper circuit, arranged to convert any of a positive or negative step feature in the received pixel signal into a corresponding respective positive or negative peak for detection by the respective positive or negative peak hold circuit.

5. The sensor of claim 1 further comprising one or more time stamp circuits arranged to output a time stamp of any detected and output positive or negative feature in a particular detection period.

6. The sensor of claim 1 wherein each pixel circuit comprises a preamplifier stage, a baseline compensation stage, and an output stage arranged to output a compensated pixel signal comprising a magnitude of a positive or negative feature detected within a particular detection period,
wherein the baseline compensation stage comprises:
a baseline storage element arranged to receive and store the pixel signal received from the preamplifier stage during a baseline interval of the detection period; and
a comparator arranged to compensate the pixel signal input to the baseline comparison stage after the baseline interval using the pixel signal stored by the baseline storage element, and to output the compensated pixel signal to the output stage.

7. The sensor of claim 6 wherein the output stage of each pixel circuit comprises a readout switch for isolating the output of the baseline compensation stage from the output stage at the end of the detection period.

8. The sensor of claim 1 wherein the detection periods are predetermined by a series or schedule of detection periods for each pixel or for the sensor.

9. The sensor of claim 1 wherein the direct conversion layer comprises CdTe, or CdZnTe, or GaAs.

10. The sensor of claim 1 wherein the direct conversion layer is monolithic.

11. The sensor of claim 1 where the array of pixels disposed across a face of the direct conversion layer is an array of anodes, and a cathode is provided on the opposing face of the direct conversion layer.

12. The sensor of claim 1 wherein the application specific integrated circuit is mounted in confrontation with the array of pixel electrodes, and optionally flip chip bonded directly to the semiconductor direct conversion layer face.

13. The sensor of claim 1 further comprising an interposer arranged to couple the array of pixel electrodes having a first pixel pitch with the array of pixel circuits having a second pixel pitch different to the first pixel pitch.

14. The sensor of claim 1 further comprising an analyser arranged to associate a positive feature in the pixel signal of each of one or more first ones of the pixel electrodes with a particular interaction event of ionizing radiation within the direct conversion layer, and to associate corresponding negative features in pixel signals of others of the pixel electrodes which are proximal to the one or more first pixel electrodes with the same interaction event.

15. The sensor of claim 14 wherein the analyser is arranged to determine a characteristic of the interaction event from the magnitudes of both the one or more positive features and the corresponding negative features.

16. The sensor of claim 15 wherein the characteristic of the interaction event is an energy of the ionizing radiation.

17. The sensor of claim 16 wherein the analyser is arranged to determine the energy of the ionizing radiation from the magnitudes of the one or more positive features corrected using a function of the magnitudes of at least some of the negative features.

18. The sensor of claim 17 wherein the function of the magnitudes of at least some of the negative features is a sum of the magnitudes of at least some of the negative features.

19. The sensor of claim 14 wherein the characteristic is a sub-pixel position of the interaction event.

20. The sensor of claim 19 wherein the analyser is arranged to determine the sub-pixel position at least partly from magnitudes of the negative features in at least some of the pixels proximal to the one or more pixel electrodes having positive features associated with the same interaction event.

21. The sensor of claim 19 wherein the analyser is arranged to determine the sub-pixel position at least partly from a centroid of magnitudes of at least negative features in at least some of the proximal or adjacent pixels.

22. The sensor of claim 14 wherein the analyser is at least partly implemented using a field programmable gate array.

23. The sensor of claim 1 wherein the predetermined detection periods are synchronised or synchronous across the array of pixels, or use a rolling shutter scheme in which the readout periods are staggered from row to row or column to column.

24. The sensor of claim 1 wherein each predetermined detection period is predefined for all of the pixels of the sensor.

25. A method of detecting ionizing radiation using a semiconductor direct conversion layer having an array of pixel electrodes disposed across a face of the layer to define pixels for detection of ionizing radiation interacting with the direct conversion layer, the method comprising:
defining a series of detection periods which are predetermined for the sensor, such that the detection periods are not determined by the presence of any radiation interaction with the sensor; and
for any particular detection period:
detecting the magnitude of a positive feature in one or more pixel signals received from one or more corresponding first pixel electrodes, the one or more positive features resulting from an interaction event of ionizing radiation with the direct conversion layer;
detecting the magnitude of corresponding negative features in pixel signals received from a plurality of pixels proximal to the one or more first pixels, the negative features resulting from the same interaction event; and
determining a characteristic of the interaction event from the magnitudes of both the one or more positive features and one or more of the corresponding negative features.

26. The method of claim 25 further comprising determining a characteristic of the interaction event from the magnitudes of both the one or more positive features and the corresponding negative features when it is determined that the positive and negative features are coincident in time.

27. The method of claim 26 wherein determining that the positive and negative features are coincident in time comprises determining one or more of: that the positive and negative features occur in a corresponding pixel detection period; and that the positive and negative features are associated with timestamps indicating that they occurred at the same time within corresponding pixel detection periods.

28. The method of claim 25 wherein the characteristic of the radiation interaction event is an energy of the ionizing radiation.

29. The method of claim 28 wherein the energy of the ionizing radiation is determined from the magnitudes of the one or more positive features corrected using a function of magnitudes of some or all of the negative features.

30. The method of claim 29 wherein the function of magnitudes of some or all of the negative features comprises a sum of the magnitudes of some or all of the negative features.

31. The method of claim 25 wherein it is determined that magnitudes of positive features in more than one pixel signal received from a corresponding plurality of first pixel electrodes correspond to the same interaction event, and determining a characteristic of the interaction event from the magnitudes of both the one or more positive features and one or more of the corresponding negative features comprises combining the magnitudes of the one or more positive features.

32. The method of claim 31 wherein combining the magnitudes of the one or more positive features comprising summing the magnitudes of the one or more positive features and applying a pixel charge sharing correction.

33. The method of claim 25 wherein the characteristic is a depth of the interaction event within the semiconductor conversion layer.

34. The method of claim 25 wherein the characteristic is a sub-pixel position of the interaction event in the plane of the array of the pixel electrodes.

35. The method of claim 34 wherein the sub-pixel position of the interaction event is determined at least partly from a centroid of magnitudes of at least some of the negative features.

36. A spectroscopic sensor of ionizing radiation, comprising:
   a semiconductor direct conversion layer; and
   an array of pixel electrodes disposed across a face of the semiconductor direct conversion layer to detect ionizing radiation interacting within the direct conversion layer,
   the sensor being arranged to operate according to a series of detection periods which are predetermined for the sensor, such that the detection periods are not determined by the presence or timing of any radiation interaction with the sensor, so as to determine a characteristic of each of a plurality of interaction events of ionizing radiation with the direct conversion layer by:
   detecting the magnitude of a positive feature in one or more pixel signals received from one or more corresponding first pixel electrodes, the one or more positive features resulting from an interaction event of ionizing radiation with the direct conversion layer;
   detecting the magnitude of corresponding negative features in pixel signals received from a plurality of pixels proximal to the one or more first pixels, the negative features resulting from the same interaction event; and
   determining a characteristic of the interaction event from the magnitudes of both the one or more positive features and one or more of the corresponding negative features.

* * * * *